United States Patent
Clark et al.

(10) Patent No.: US 11,919,647 B2
(45) Date of Patent: Mar. 5, 2024

(54) THERMAL CONTROL SYSTEMS FOR AIRCRAFT LANDING GEAR WHEEL WELLS AND RELATED METHODS

(71) Applicant: The Boeing Company, Chicago, IL (US)

(72) Inventors: Andrew David Clark, Mill Creek, WA (US); Thamir Rauf Al-Alusi, Hayward, CA (US); David William Kirkbride, Allyn, WA (US); Frederick T. Calkins, Renton, WA (US); Bradley J. Mitchell, Snohomish, WA (US)

(73) Assignee: The Boeing Company, Arlington, VA (US)

( * ) Notice: Subject to any disclaimer, the term of this patent is extended or adjusted under 35 U.S.C. 154(b) by 453 days.

(21) Appl. No.: 16/875,704

(22) Filed: May 15, 2020

(65) Prior Publication Data
US 2021/0354831 A1    Nov. 18, 2021

(51) Int. Cl.
*B64D 13/02* (2006.01)
*B60T 5/00* (2006.01)
*B64C 25/00* (2006.01)
*B64C 25/42* (2006.01)
*F16D 65/78* (2006.01)

(52) U.S. Cl.
CPC .............. *B64D 13/02* (2013.01); *B60T 5/00* (2013.01); *B64C 25/001* (2013.01); *B64C 25/42* (2013.01); *F16D 65/78* (2013.01)

(58) Field of Classification Search
CPC ......... B60T 5/00; B64C 25/42; B64C 25/001; B64D 13/02
See application file for complete search history.

(56) References Cited

U.S. PATENT DOCUMENTS

| | | | | |
|---|---|---|---|---|
| 6,315,091 B1 * | 11/2001 | Nilsen | ................... | F16D 65/847 |
| | | | | 188/71.6 |
| 8,333,438 B2 * | 12/2012 | Caule | .................... | B64C 25/36 |
| | | | | 188/264 AA |
| 9,573,567 B2 * | 2/2017 | Kirkbride | ............. | F16D 65/847 |
| 9,868,534 B2 * | 1/2018 | Hara | ...................... | B64C 25/36 |

(Continued)

FOREIGN PATENT DOCUMENTS

| | | |
|---|---|---|
| EP | 2772428 | 9/2014 |
| EP | 3048041 | 7/2016 |
| EP | 3321181 | 5/2018 |

OTHER PUBLICATIONS

European Patent Office, "Extended European Search Report," issued in connection with European Patent Application No. 21173888.5, dated Oct. 11, 2021, 8 pages.

*Primary Examiner* — Michael H Wang
(74) *Attorney, Agent, or Firm* — Hanley, Flight & Zimmerman, LLC

(57) ABSTRACT

Thermal control system for aircraft main landing gear wheel wells and related methods are disclosed. An example thermal control system includes a conduit defining a fluid passageway between an inlet and an outlet. The inlet of the conduit positioned in fluid communication with a landing gear wheel well and the outlet of the conduit positioned in fluid communication with the atmosphere. The conduit generates a pressure differential through the fluid passageway between the inlet and the outlet to exhaust heat from the landing gear wheel well to the atmosphere.

23 Claims, 25 Drawing Sheets

(56) References Cited

U.S. PATENT DOCUMENTS

| | | | |
|---|---|---|---|
| 10,597,148 B2* | 3/2020 | Meinel Cheesman | .................... F16D 65/847 |
| 10,935,093 B2* | 3/2021 | Hosamane | .............. F16D 65/78 |
| 2012/0241557 A1 | 9/2012 | Coty | |
| 2014/0345991 A1* | 11/2014 | Zywiak | ................ B64D 13/006 188/264 R |
| 2015/0097078 A1* | 4/2015 | Mueller | .................. B64C 25/42 244/50 |
| 2016/0214720 A1* | 7/2016 | Hara | ..................... B64C 25/001 |
| 2018/0134375 A1* | 5/2018 | Christman | .............. B64C 25/34 |
| 2019/0112037 A1* | 4/2019 | Meinel Cheesman | ....................... B64D 13/006 |
| 2020/0300320 A1* | 9/2020 | Francis | .................. B60B 21/00 |
| 2021/0231184 A1* | 7/2021 | Ganesh | ................ B64C 25/423 |

* cited by examiner

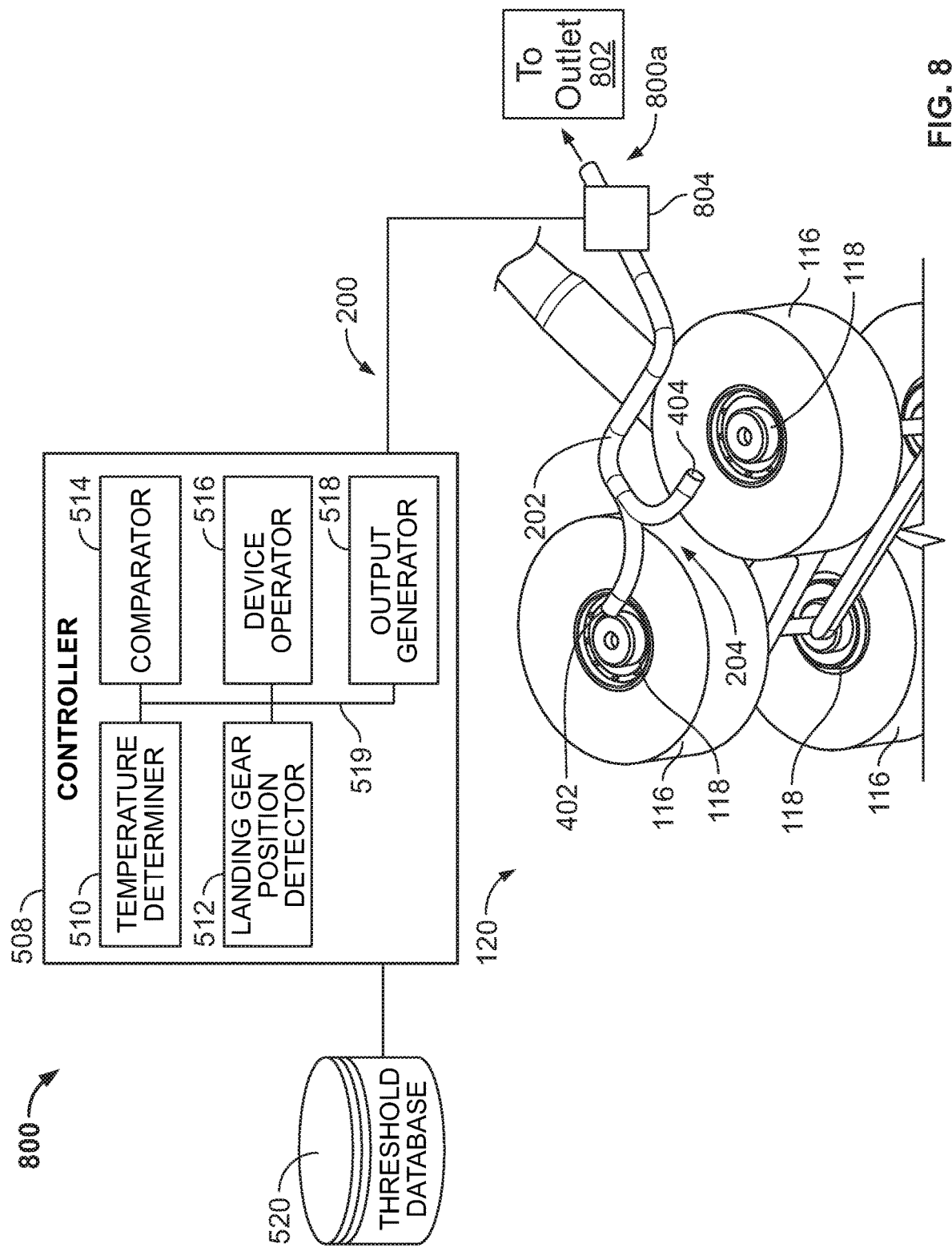

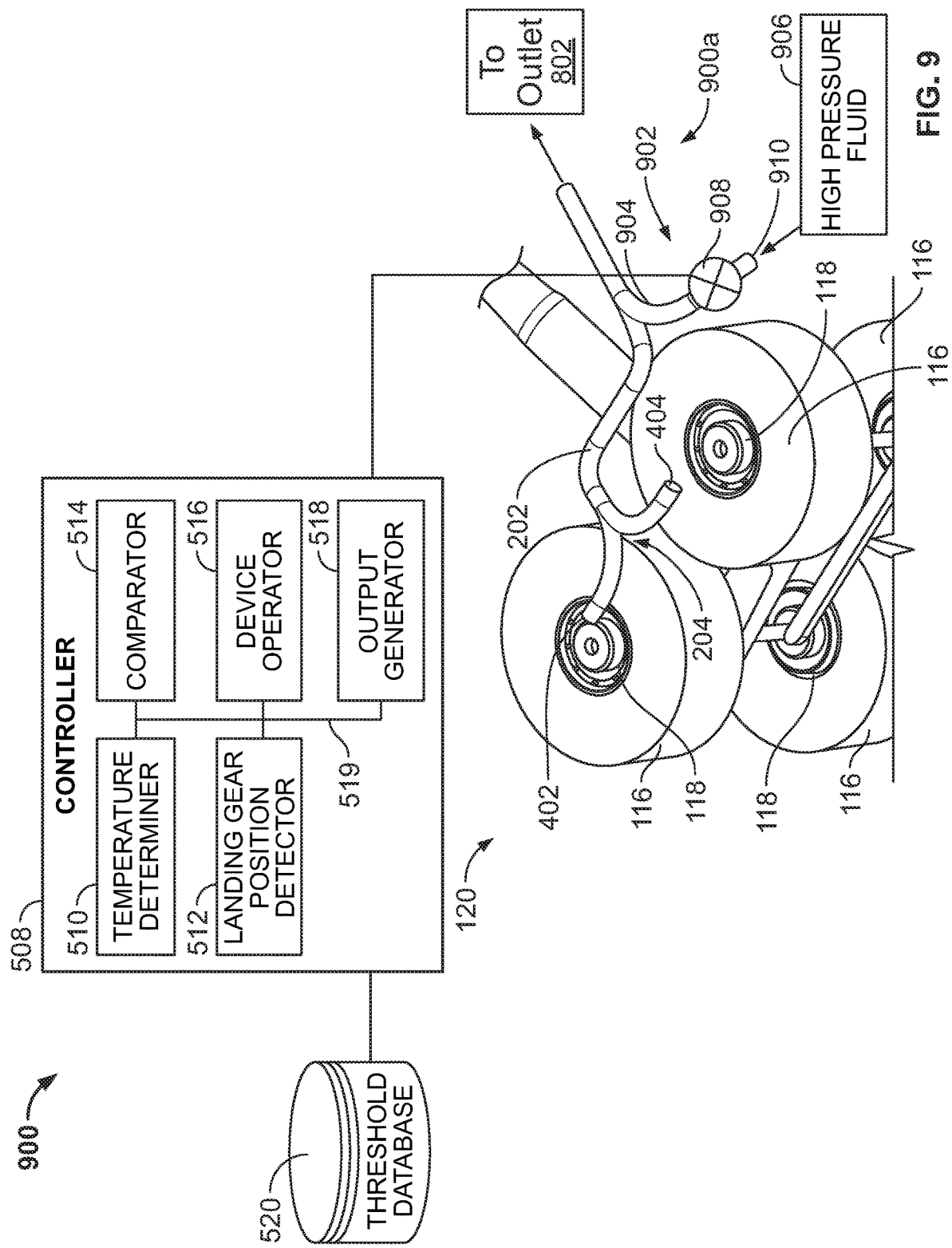

THERMAL CONTROL SYSTEMS FOR AIRCRAFT LANDING GEAR WHEEL WELLS AND RELATED METHODS

FIELD OF DISCLOSURE

The present disclosure relates generally to aircraft and, more particularly, to thermal control systems for aircraft main landing gear wheel wells and related methods.

BACKGROUND

Brakes of aircraft wheels generate significant heat when stopping an aircraft during a landing event. In some such instances, heated brakes of an aircraft landing gear can reach over 1000 degrees Fahrenheit (° F.) and radiate and convect a significant amount of heat to surrounding structures. In some instances, the aircraft may take-off for subsequent flight soon after landing without sufficient time for the brakes to cool (e.g., to surrounding ambient temperature). As a result, the heat generated by the brakes transfers to surrounding structure of the aircraft when the landing gear is retracted into a landing gear wheel well of the aircraft.

SUMMARY

An example thermal control system includes a conduit defining a fluid passageway between an inlet and an outlet. The inlet of the conduit positioned in fluid communication with a landing gear wheel well and the outlet of the conduit positioned in fluid communication with the atmosphere. The conduit generates a pressure differential through the fluid passageway between the inlet and the outlet to exhaust heat from the landing gear wheel well to the atmosphere.

An example apparatus includes a first conduit defining a first inlet positioned in a landing gear wheel well of the aircraft. The first inlet located immediately adjacent a first brake of a first wheel of a first aircraft landing gear when the first aircraft landing gear is retracted in the landing gear wheel well. The example apparatus includes a second conduit defining a second inlet positioned in the landing gear wheel well of the aircraft. The second inlet located immediately adjacent a second brake of a second wheel of the aircraft landing gear when the aircraft landing gear is retracted in the landing gear wheel well. The example apparatus includes a main conduit defining an outlet in fluid communication with the atmosphere. The main conduit fluid couples the first inlet of the first conduit and the second inlet of the second conduit to the outlet.

An example apparatus includes means for defining a fluid passageway between an inlet and an outlet, wherein the inlet of the means for defining a fluid passageway is positioned in fluid communication with a landing gear wheel well and the outlet of the means for defining a fluid passageway is positioned in fluid communication with the atmosphere. The example system includes means for generating a pressure differential through the means for defining the fluid passageway to induce fluid flow from the inlet toward the outlet to exhaust heat from the landing gear wheel well.

BRIEF DESCRIPTION OF THE DRAWINGS

FIG. 8 is a perspective view of another example thermal control system disclosed herein.

FIG. 9 is a perspective view of another example thermal control system disclosed herein.

Figure 1:
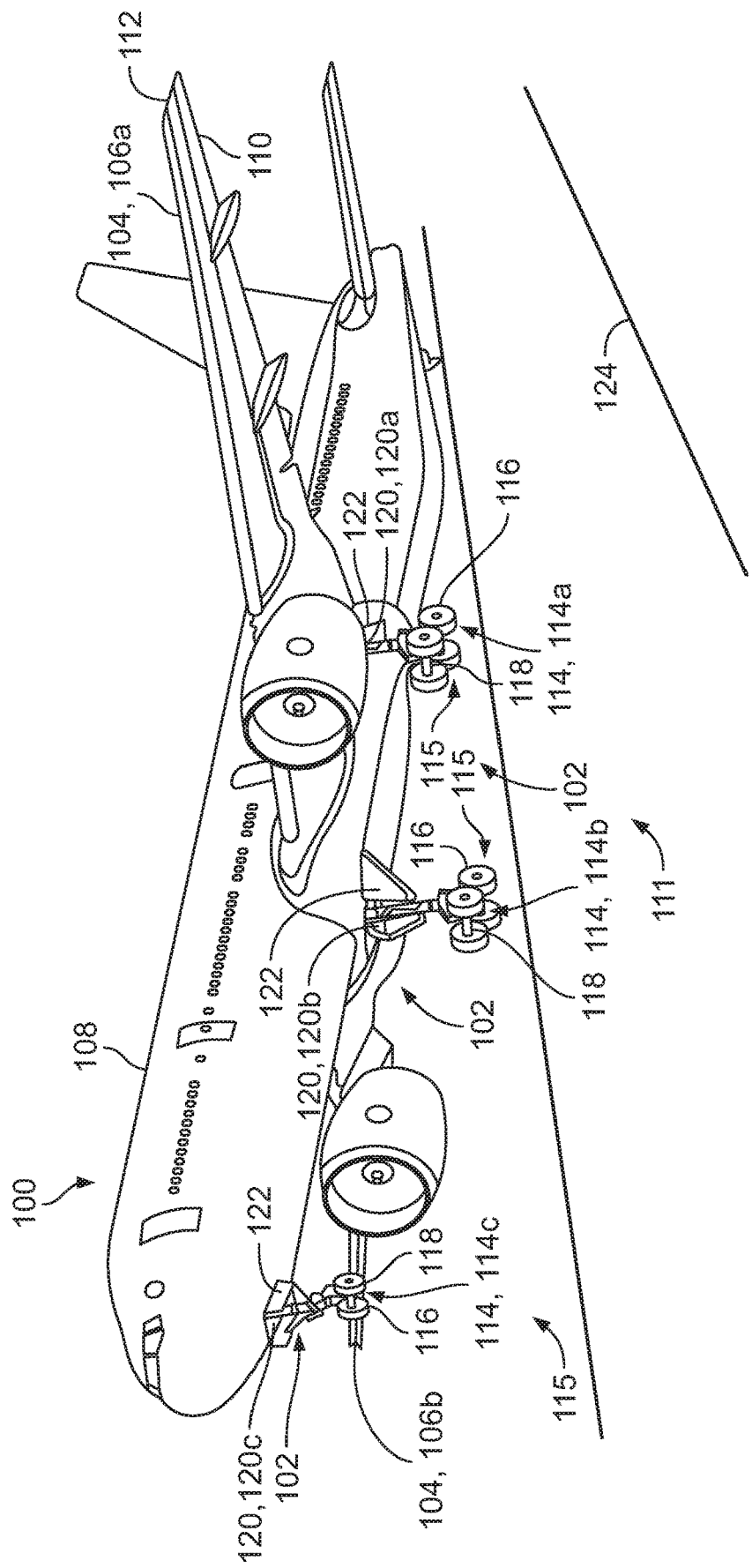
FIG. 1 is an example aircraft having an example thermal control system in accordance with teachings of this disclosure.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located there between. Stating that any part is in contact with another part means that there is no intermediate part between the two parts. Additionally, one example's features are not mutually exclusive to another example's features.

DESCRIPTION

Aircraft landing gear generate significant heat during a braking event when landing. In some instances, the aircraft returns to flight within a timeframe in which there is still stored thermal energy in the brakes and/or insufficient to allow the brake system to cool to the surrounding ambient temperature. As a result, the braking system of the landing gear transfers significant heat stored in the brakes within a wheel well of the landing gear when the landing gear is retracted after take-off. In such instances, when the landing gear is stored and enclosed in the wheel well during flight, the heat emanating from the braking system of the landing gear can cause the air temperature in the wheel well to increase significantly. For example, a braking system of an aircraft landing gear can reach temperatures of approximately 1000° F. when positioned in a main landing gear wheel well under normal operations.

To protect primary structures and/or components (e.g., wing box structures, etc.) from the elevated air temperature, aircraft often employ a heat shield plate. The heat shield plate is positioned in the wheel well between the landing gear and the primary structure to be protected from the elevated temperatures. When the landing gear is stored in the wheel well, heat from braking system rises against the heat shield plate. The heat shield plate is effective at blocking or restricting radiation heat from the brakes. However, the heat shield plate is heavy (e.g., greater than 100 pounds (lbs)) and significantly increases manufacturing costs.

Moreover, the heat shield plate is not removing convective heat from the main landing gear wheel well. For example, the heat shield plate has a large surface area (e.g., a length and/or width) to allow the heated air to cool as the heated air traverses a surface area of the heat shield plate and spills over its respective edges. To help with removal of convective heat from the brakes, aircraft employ a mixing approach. Specifically, seals from a main landing gear door are often removed to allow cool air (from the atmosphere) to be drawn into the wheel well to low pressure locations in a cavity of the wing. However, this approach requires a significant amount of airflow to pass through the wheel well because air is drawn in via the door and extracted at significant distances from the heat source (e.g., the brakes of the wheels). Therefore, a significant amount of airflow is needed to mix with the heated air in the wheel well to cool the air temperature of the wheel well. Additionally, the amount of airflow required to flow through the wheel well increases drag.

Moreover, because the above-noted airflow approach does not remove heat directly from the source (e.g., the brakes), in some instances, primary aircraft structures adjacent the wheel well that may be affected by the heat from the brakes require increased structural support (e.g., by increasing a dimensional envelope of the primary structure and/or the material(s) used to manufacture the primary structure (e.g., titanium in place of steel)). However, increasing structural support of the primary structure increases manufacturing costs and/or weight. In some instances, aircraft manufacturers employ gapping spoilers (i.e., air brakes) to produce a lower negative pressure in a wing cavity to remove heat from the wheel well. However, gapping between the spoilers is inefficient during flight because the gaps between the spoilers significantly increase drag when the spoilers are not needed.

To reduce thermal effects from heat generated by the brakes on the primary structure(s) and/or component(s) located in a landing gear wheel well of an aircraft, example apparatus and methods disclosed herein employ a thermal control system. Example thermal control systems disclosed herein remove or extract heat directly from a heat generating source (e.g., the brakes located in a main landing gear wheel well). Example thermal control systems disclosed herein reduce bulk average air temperatures and structural temperatures within the main landing gear wheel well, allowing for a lower cost, lighter weight and lower drag on an aircraft. In contrast to the above-noted mixing approach, directly removing heat from the source requires less airflow, which reduces the drag count on the aircraft. Additionally, significantly lower temperatures can be achieved in the wheel well, which results in less thermal protection of the primary structures and thereby reduces weight and manufacturing costs.

Example thermal control systems disclosed herein include a ventilation system to reduce convective heat transfer to a primary structure and/or component (e.g., equipment) in the wheel well and a heat shield system to reduce radiation heat transfer to the primary structure and/or component in the wheel well. Some example ventilation systems disclosed herein include a conduit defining a fluid passageway between an inlet and an outlet. For example, the conduit is a pipe or duct to exhaust air from a landing gear wheel well. Specifically, the inlet of the conduit is positioned in fluid communication with a landing gear wheel well (e.g., immediately adjacent and/or above the brakes of the aircraft wheels) and the outlet of the conduit is positioned in fluid communication with the atmosphere. In some examples, the outlet is positioned adjacent a low pressure area external to the aircraft (e.g., an upper airfoil (e.g., a wing) of the aircraft, fuselage, etc.).

Some example ventilation systems disclosed herein employ air momentum generated by a pressure differential through the fluid passageway between the inlet and the outlet to exhaust heat from the landing gear wheel well. For example, an inlet is in fluid communication with a wheel well (e.g., a high pressure area) and an outlet is in fluid communication with an area having a pressure that is less than a pressure of the air in the wheel well (e.g., the high pressure area). In some examples, a pressure differential is generated or induced by a low pressure at the outlet and relatively higher pressure air in the wheel well in communication with the inlet. The higher pressure air in communication with the inlet flows to the lower pressure at the outlet, which causes the heat from a brake of a wheel located in the wheel well to flow to the outlet. In some examples, air momentum through the fluid passageway is generated by a fan, a blower or other mechanical device to induce a pressure differential through the fluid passageway and cause airflow to flow from the inlet to the outlet. In some examples, air momentum in the fluid passageway is generated by other air sources. For example, the fluid passageway can receive high pressure airflow (e.g., high pressure bleed air from an eductor) to cause the heated air from the brakes to flow from the inlet to the outlet. In some examples, air momentum in the fluid passageway is generated by a higher freestream pressure. For example, main landing gear door (MLGD) seals can be removed at locations where pressure is greater than a pressure at the outlet or exhaust of the passageway, thereby providing a pressure differential between the inlet of the fluid passageway and the outlet of the passageway.

Thus, the examples disclosed herein include means for generating a pressure differential. For example, a means for generating a pressure differential includes, for example: a delta pressure between two locations defined by an inlet at the first location and an outlet at a second location spaced from the first location; means for generating a pressure differential; a delta pressure between two exterior surface locations; a mechanical device such as, for example, a blower, a motor, an eductor, air momentum, etc.

In some examples, thermal control systems disclosed herein employ a diffusor. An example diffusor disclosed herein defines a cavity in fluid communication with the inlet of the conduit. The diffusor channels heat toward the inlet of the fluid passageway and/or blocks or restricts radiation heat transfer to surrounding primary structure or components located in the landing gear wheel well.

Example thermal control systems disclosed herein include brake overheat and/or fire detection systems. Typically, known overheat and/or fire detection systems monitor air temperature and trigger at a certain temperature threshold or set-point (e.g., a brake overheat temperature threshold, a fire temperature threshold, etc.). Known overheat and/or fire detection systems often include temperature sensors or probes located at a pressure deck of a wheel well at a distance outside of a radiation view of the brakes to avoid false alarms. Thus, known overheat and/or fire detection systems often monitor air temperature at a location remote from the brakes. In other words, known overheat and/or fire detection systems rely on thermal energy from the brakes in the form of buoyancy to carry the thermal energy to the detection systems. Such known overheat and/or fire detection systems can lead to a lag between the brake overheat event and detection of the brake overheat event.

Example thermal control systems disclosed herein include overheat and/or fire detection systems that are integral with a ventilation system. In this manner, the overheat and/or fire detection systems measure air temperature of the heated air ventilated from directly above the brakes of the wheels (i.e., immediately adjacent the brakes). As a result, the overheat and/or fire detection systems disclosed herein eliminate lag between a brake overheat event and detection of the brake overheat event.

FIG. 1 is an example aircraft 100 having an example thermal control system 102 in accordance with teachings of this disclosure. The aircraft 100 of FIG. 1 is a commercial aircraft that includes one or more thermal control system(s) 102 disclosed herein. Although a commercial aircraft is shown in FIG. 1, the thermal control system 102 and related methods disclosed herein can be implemented with any other example aircraft such as, for example, military aircraft (e.g., a tilt rotor, a jet fighter), transport aircraft and/or any other suitable aircraft.

The aircraft 100 includes airfoils 104 defining a first wing 106a (e.g., a left-side wing) and a second wing 106b (e.g., a right-side wing) that extend from a fuselage 108. During flight, the airfoils 104 (e.g., the first wing 106a, the second wing 106b) produce lift by using energy of freestream airflow. To produce lift, pressure on a lower surface 110 (e.g., a portion) of the airfoils 104 (e.g., a high pressure area) is greater than pressure on an upper surface 112 (e.g., a low pressure area, a portion) of the airfoils 104.

To support the aircraft 100 on a surface 124 (e.g., a runway) and/or facilitate landing, taxing, parking etc., the aircraft 100 of FIG. 1 includes a landing system 111. The landing system 111 includes landing gear 114. The landing gear 114 includes wheels 116 and brakes 118. The landing gear 114 moves relative to a wheel well 120 between a deployed position 115 (e.g., as shown in FIG. 1) and a retracted position (e.g., a retracted position 200 of FIG. 2B). The aircraft 100 of FIG. 1 includes a first landing gear 114a, a second landing gear 114b and a third landing gear 114c. The aircraft 100 of FIG. 1 includes a first wheel well 120a to receive the first landing gear 114a, a second wheel well 120b to receive the second landing gear 114b and a third wheel well 120c to receive the third landing gear 114c. The above-noted numbers of landing gears and wheel wells are merely examples and, thus, other examples can employ other number of (e.g., front and/or rear) landing gears and wheel wells without departing from the scope of this disclosure.

During landing, the landing gear doors 122 move to an open position to allow the landing gear 114 to extend from the wheel well 120 to the deployed position 115 (e.g., the first landing gear 114a extends from the first wheel well 120a, the second landing gear 114b extends from the second wheel well 120b, and the third landing gear 114c extends from the third wheel well 120c). The brakes 118 of the wheels 116 activate to stop the aircraft 100 moving along the surface 124 (e.g., the runway). The brakes 118 (e.g., carbon disks) generate significant heat when stopping the aircraft 100. For example, the brakes 118 can generate temperatures in excess of 1000 degrees Fahrenheit (° F.).

To travel from one destination (e.g., an airport) to another, the aircraft 100 can perform a plurality of braking events such as, for example, taxiing from a departure gate to a runway, landing, taxiing from a runway to an arrival gate, and parking. During a given time period (e.g., one day), the aircraft 100 can travel to a plurality of destinations and, thus, can perform a plurality of braking events. Thus, in some instances, the aircraft 100 can return to flight shortly after landing. For example, in some instances, the aircraft can return to flight prior to the brakes 118 cooling to a reduced (e.g., desired) temperature (e.g., 100° F.). For example, the brakes 118 can take several hours to cool from a temperature of 1000° F. to a temperature of 100° F. In some instances, the aircraft 100 can return to flight in less than 2 hours (e.g., a half-hour) after landing.

During flight, the landing gear 114 moves to the retracted position (e.g., the retracted position 200 of FIG. 2B) within the wheel well 120 (e.g., the first landing gear 114a retracts within the first wheel well 120a, the second landing gear 114b retracts within the second wheel well 120b, and the third landing gear 114c retracts within the third wheel well 120c). The landing gear doors 122 move to a closed position to enclose the wheel well 120 and form an aerodynamic surface of the fuselage 108 to reduce drag and increase fuel efficiency. As a result, when the landing gear 114 retracts and the landing gear doors 122 enclose the wheels 116 within the wheel well 120, the brakes 118 radiate heat, which can cause a temperature of primary structures of the aircraft 100 and/or other components in the wheel wells 120 to become elevated. To withstand elevated temperatures, aircraft often employ venting systems and/or thermal protection plates located in the wheel well 120. In some instances, aircraft primary structure and/or other components are formed of material(s) and/or have dimensional characteristics (e.g. thickness) that enable the structures or components to withstand such elevated temperatures. However, such approaches significantly reduce aircraft efficiency (e.g., increase aircraft weight) and increase manufacturing cost(s).

The thermal control system 102 disclosed herein ventilates or exhausts heat from the wheel well 120. For example, the thermal control system 102 ventilates heat from the wheel well 120 when the landing gear 114 is in the retracted position 200 (FIG. 2B). In some examples, the thermal control system 102 disclosed herein ventilates heated air before the air mixes with the rest of the air in the wheel well 120. Additionally, the thermal control system 102 disclosed herein reduces manufacturing costs and increases aircraft efficiency.

Figure 2A:
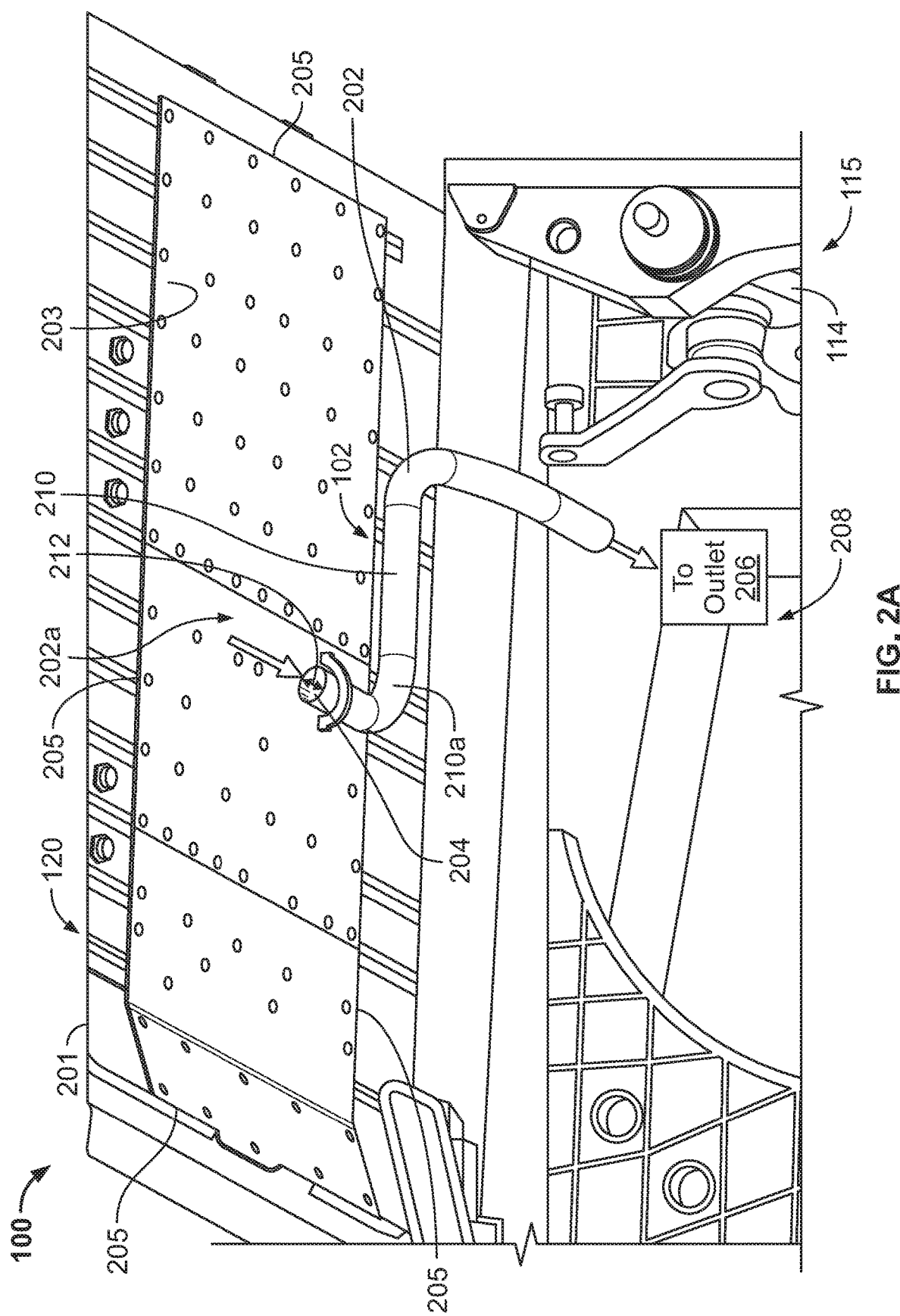
FIGS. 2A-2C illustrate the example thermal control system of FIG. 1.
Figure 2B:
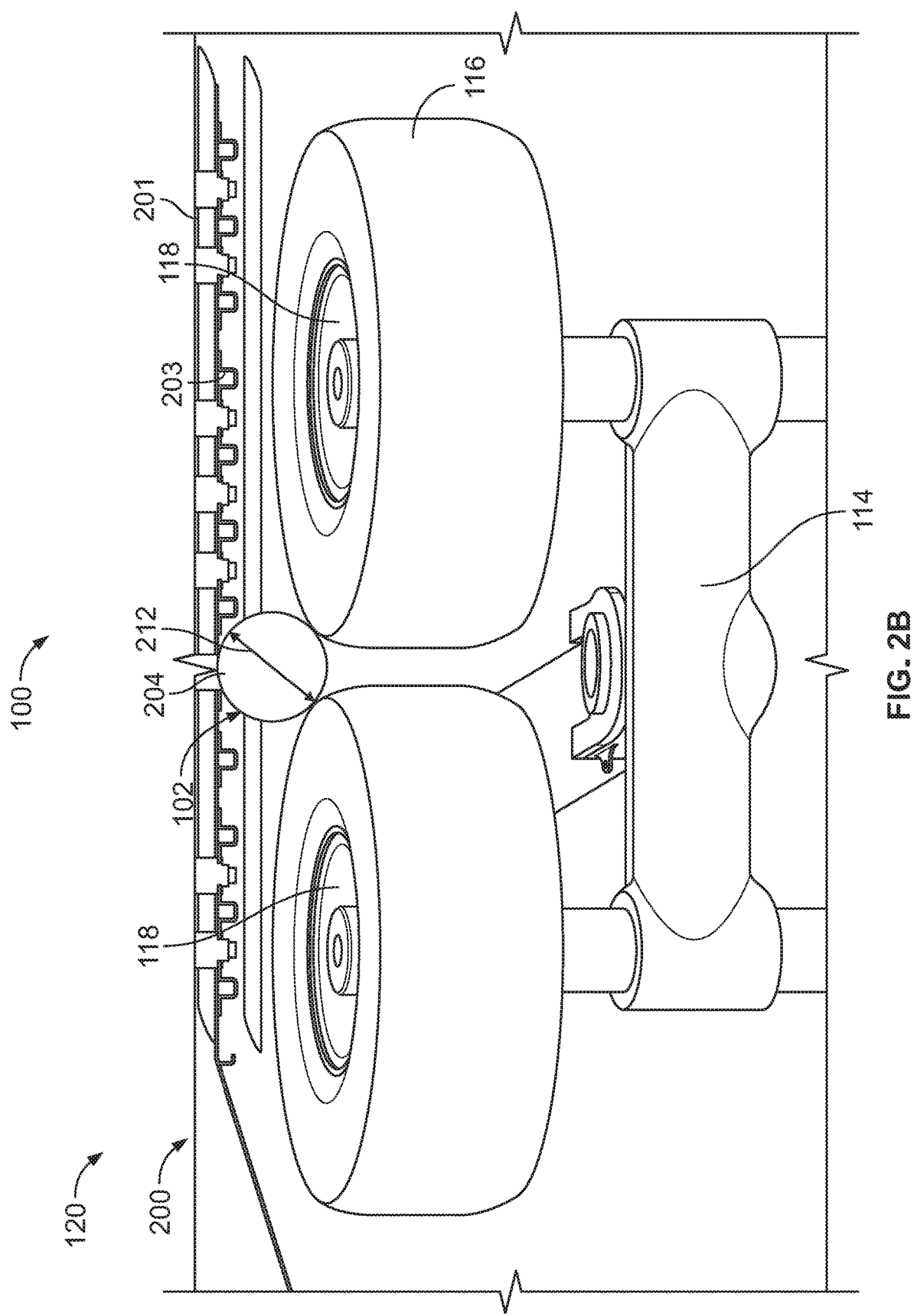
Figure 2C:
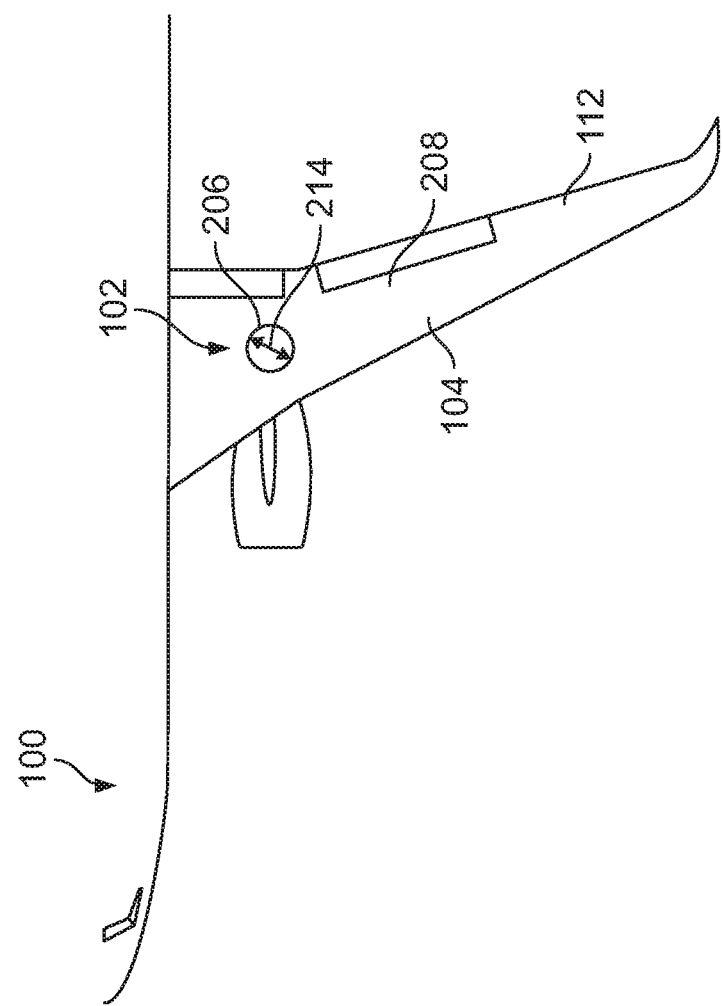

FIGS. 2A-2C illustrate the thermal control system 102 of FIG. 1. FIG. 2A is a partial, perspective view of the wheel well 120 implemented with the thermal control system 102 of FIG. 1. FIG. 2B is a front view of the wheel well 120 of FIG. 2A. FIG. 2C is a partial, top view of the airfoil 104 of the aircraft 100 of FIG. 1. FIG. 2A is shown with the landing gear 114 in the deployed position 115 (FIG. 1). FIG. 2B is shown with the landing gear 114 in the retracted position 200 within the wheel well 120. The wheel well 120 of FIGS. 2A and 2B can implement the first wheel well 120a, the second wheel well 120b and/or the third wheel well 120c of the aircraft 100 of FIG. 1.

The wheel well 120 of FIG. 2A is defined by a primary structure 201 of the aircraft 100. For example, the primary structure 201 of the aircraft 100 includes, for example, a frame, a rib, a stiffener, a wing box, a beam, a joint, etc., and/or any other structural component(s). The wheel well 120 can include aircraft components including, for example, wires, tubing, equipment (e.g., compressors) and/or any other component(s) of the aircraft 100. To protect the primary structure 201 and/or the aircraft components from thermal conditions (e.g., heat generated by the brakes 118) when the landing gear 114 is in the retracted position 200 (e.g., retracted in the wheel well 120), the wheel well 120 includes a thermal protection plate 203 and the thermal control system 102. The thermal protection plate 203 is attached to the primary structure 201 and is positioned adjacent the wheels 116 of the landing gear 114 when the landing gear 114 is in the retracted position 200. The thermal protection plate 203 allows heat to disperse along a surface area of the thermal protection plate 203 to allow the heated air to cool as the air travels to lateral (e.g., perimeter) edges 205 of the thermal protection plate 203. The thermal protection plate 203 protects the primary structure 201 and/or the aircraft components from radiated heat energy from the brakes 118 (e.g., by reducing thermal radiation heat transfer). For example, the thermal protection plate 203 protects the primary structure 201 located directly above the wheels 116 when the landing gear 114 is in the retracted position 200. The thermal protection plate 203 can be composed of aluminum and/or other material(s) that reduce thermal radiation heat transfer (e.g., reflects thermal radiation).

To exhaust or remove (e.g., ventilate) heated air from the wheel well 120, the wheel well 120 includes the thermal control system 102. Referring to FIGS. 2A-2C, the thermal control system 102 includes a ventilation system 202a that removes brake heat before the brake heat mixes with the air in the wheel well 120. The ventilation system 202a has a fluid passageway 202 between an inlet 204 and an outlet 206. The inlet 204 of the fluid passageway 202 is positioned in fluid communication with a cavity 208 defining the wheel well 120 and the outlet 206 is in fluid communication with the atmosphere. Specifically, the inlet 204 is suspended from the primary structure 201 and/or the thermal protection plate 203 of the wheel well 120 at a location immediately adjacent (e.g., above) the brakes 118 of the wheel 116 when the landing gear 114 is in the retracted position 200.

The fluid passageway 202 of FIGS. 2A-2C is defined by a conduit 210. The conduit 210 can be a duct, a pipe, a hose, and/or any other fluid passageway. The conduit 210 of FIGS. 2A-2C has a circular cross-sectional profile having a constant diameter between the inlet 204 and the outlet 206. In some examples, the cross-sectional profile (e.g., the diameter) of the fluid passageway 202 varies (e.g., increases or decreases) between the inlet 204 and the outlet 206. In some examples, the fluid passageway 202 can have a rectangular cross-sectional shape, a square cross-sectional shape, and/or any other cross-sectional shape.

The conduit 210 is attached to the thermal protection plate 203, the primary structure 201 and/or any other structure of the aircraft 100. In particular, a portion 210a of the conduit 210 is supported by the thermal protection plate 203 such that the inlet 204 is positioned adjacent (e.g., within a perimeter of) the thermal protection plate 203. In this manner, the inlet 204 is positioned adjacent (e.g., immediately adjacent) the wheels 116 of the landing gear 114.

To exhaust or remove heat directly from the brakes 118 (e.g., a heat source) located in the wheel well 120, the thermal control system 102 employs air momentum generated by a pressure differential between the inlet 204 and the outlet 206. Specifically, to generate the pressure differential, the outlet 206 is formed on an external surface of the airfoil 104 having a pressure (e.g., a local pressure along a boundary line) that is less than a pressure of air inside the wheel well 120 in communication with the inlet 204. For example, the outlet 206 routes to a low center of pressure ($C_p$) location on an external aerodynamic surface (e.g., the airfoil 104) of the aircraft 100 to draw (e.g., via suction) hot air from above the brakes 118 via the inlet 204 and exhausts the hot air overboard via the outlet 206. As most clearly shown in FIG. 2C, the outlet 206 is formed on the upper surface 112 of the airfoil 104 (e.g., the first wing 106a) of the aircraft 100.

Thus, a pressure difference between air pressure at the inlet 204 and air pressure at the outlet 206 (along with a length) of the fluid passageway 202 induces fluid flow to exhaust heat from the wheel well 120 to the atmosphere. For example, a pressure differential can provide a suction or vacuum in the fluid passageway 202 and/or the wheel well 120. In this manner, fluid flow is induced or generated by a pressure differential through the fluid passageway 202 to cause air in the first wheel well 114a to flow toward, and exhaust from, the outlet 206 (e.g., the atmosphere). The upper surface 112 of the airfoil 104 has a pressure distribution or average pressure that is less than a pressure distribution or average pressure at the lower surface 110 of the airfoil 104. Thus, the low pressure area at the upper surface 112 of the airfoil 104 provides a pressure differential between a pressure of the air at the inlet 204 and a pressure of the air at the outlet 206.

In some examples, the outlet 206 can be provided on the lower surface 110 of the airfoil 104 and/or any other surface of the fuselage 108 and/or the aircraft 100. In some examples, the outlet 206 is not formed or provided on the airfoil 104. In some examples, a flow generator (e.g., a fan, a blower, an eductor, a vacuum) can be interposed in the fluid passageway 202 to generate a pressure differential through the fluid passageway 202 that causes fluid flow through the fluid passageway 202 from the inlet 204 to the outlet 206. In some such examples, the outlet 206 can be configured to exhaust air to other areas of the aircraft 100 such as, for example, an interior of the airfoil 104, the fuselage 108 (e.g., a cargo compartment), a system (e.g., a heat exchanger), and/or any other portion or system of the aircraft 100.

The inlet 204 and the outlet 206 of the illustrated example have a circular profile. Additionally, the inlet 204 defines an area that is substantially similar (e.g., equal to or within 10 percent) of an area defined by the outlet 206. For example, the inlet 204 has a diameter 212 that is substantially similar (e.g., equal to or within 10 percent) of a diameter 214 (FIG. 2C) of the outlet 206. In some examples, however, the inlet 204 can have a cross-sectional shape (e.g., a rectangular shape, a square shape, etc.) or size (e.g., an area, a diameter, etc.) that is different than a shape or size of the outlet 206. For example, the inlet 204 can have a circular cross-sectional shape and the outlet 206 can have a rectangular cross-sectional shape. In some examples, the inlet 204 and/or the outlet 206 can have a rectangular cross-sectional shape, a square cross-sectional shape, and/or any other cross-sectional shape. In some examples, the inlet 204 can have an area that is different (e.g., smaller or larger) than an area of the outlet 206.

Referring to FIGS. 2A-2C, in operation, the thermal protection plate 203 and the thermal control system 102 protect the primary structure 201 and/or other components in the wheel well 120 from elevated temperatures. The thermal protection plate 203 reduces or blocks heat transfer via thermal radiation. Additionally, the ventilation system 202a reduces heat transfer via convention by exhausting heated air from the brakes 118. Specifically, the pressure differential created through the fluid passageway 202 between the inlet 204 and the outlet 206 induces airflow to cause the heat generated by the brakes 118 of the wheels 116 to exhaust to the atmosphere. In other words, a vacuum or suction created through the fluid passageway 202 induces heated air from the brakes 118 to flow from the inlet 204 to the outlet 206, thereby protecting the primary structure 201 and/or other components in the wheel well 120 from elevated temperatures. Additionally, the thermal control system 102 enables the thermal protection plate 203 to have a smaller size (e.g., a smaller surface area than known heat shield plates) because the ventilation system 202a removes heat directly from the brakes 118 before the heat mixes with air in the wheel well 120. As a result, the thermal protection plate 203 of the illustrated example is significantly smaller than known thermal protection plates. For example, the thermal protection plate 203 has a surface area that is approximately between 10 percent and 80 percent (e.g., 50 percent) smaller than known thermal protection plates, which increases aircraft efficiency and reduces manufacturing costs. Additionally, because the thermal control system 102 reduces thermal or temperature impact to the primary structure 201 and/or other components (equipment) in the wheel well 120, the primary structure 201 and/or components can be made with a smaller dimensional footprint (e.g., thickness) or less expensive material(s).

Figure 3:
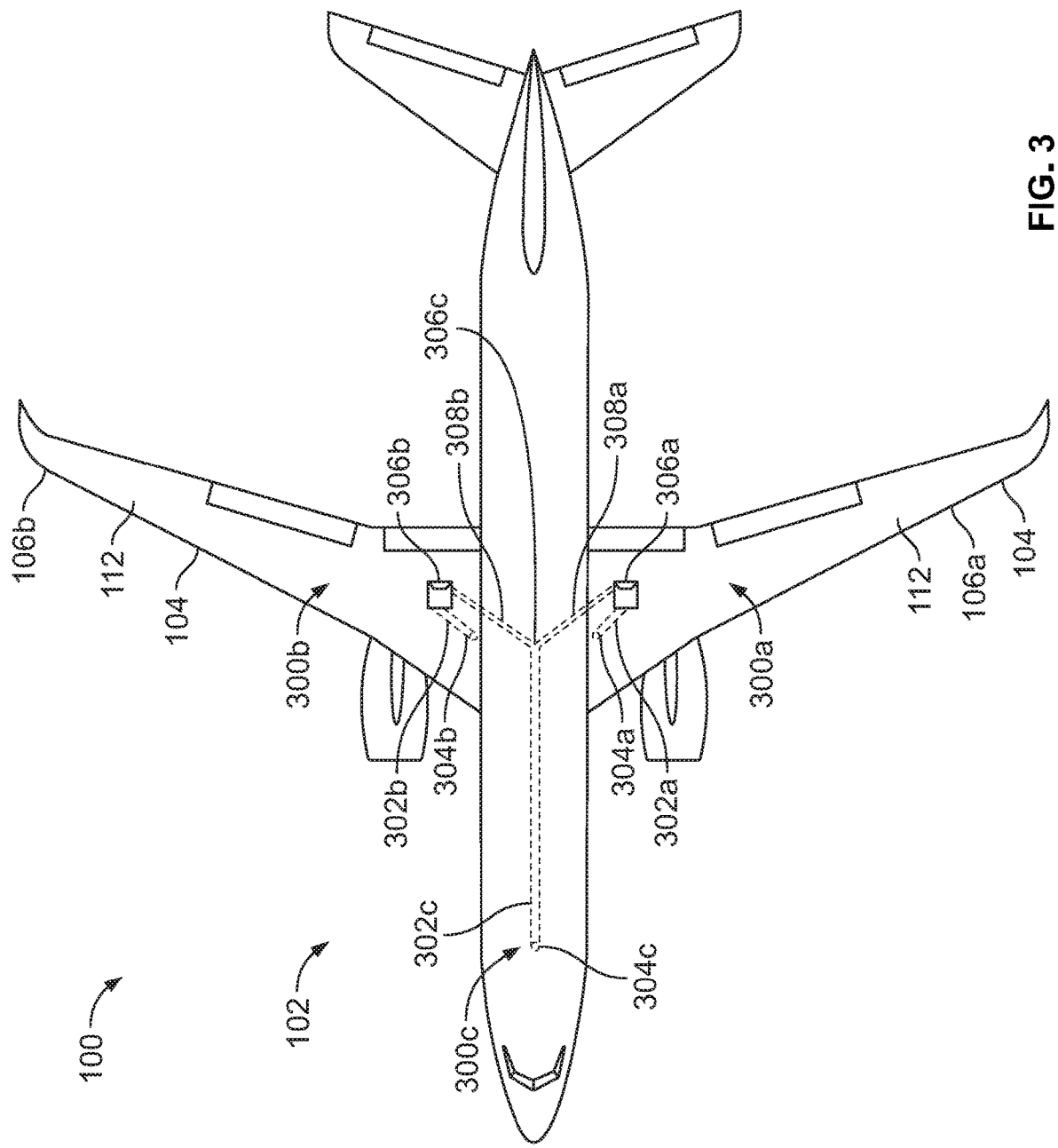
FIG. 3 is a top view of the aircraft of FIG. 1.

FIG. 3 is a top view of the aircraft 100 of FIG. 1. The thermal control system 102 of FIG. 3 includes a first thermal control system 300a, a second thermal control system 300b, and a third thermal control system 300c. The first thermal control system 300a is associated with the first wheel well 120a and removes heat generated by the brakes 118 of the wheels 116 of the first landing gear 114a located in the first wheel well 120a (FIG. 1). The second thermal control system 300b is associated with the second wheel well 120b and removes heat generated by the brakes 118 of the wheels 116 of the second landing gear 114b located in the second wheel well 120b (FIG. 1). The third thermal control system 300c is associated with the third wheel well 120c removes heat generated by the brakes 118 of the wheels 116 of the third landing gear 114c located in the third wheel well 120c (FIG. 1).

Each of the first, second and third thermal control systems 300a-c can be implemented by the thermal control system 102 of FIGS. 1 and 2A-2C. For example, the first thermal control system 300a includes a first passageway 302a between a first inlet 304a and a first outlet 306a. The first inlet 304a is positioned in fluid communication with the first wheel well 114a and the first outlet 306a is in fluid communication with the atmosphere. Specifically, the first outlet 306a is formed on the upper surface 112 of the first wing 106a of the aircraft 100. To exhaust or remove the heat from the first wheel well 114a, a pressure differential is generated between the first inlet 304a and the first outlet 306a. Specifically, the first outlet 306a is formed on the airfoil 104 at a location that has a pressure (e.g., a local pressure along a boundary line) that is less than a pressure of air inside the first wheel well 114a. Thus, the pressure difference between air pressure at the first inlet 304a and air pressure at the first outlet 306a induces fluid flow (e.g., a suction or vacuum) to exhaust heat from the first wheel well 114a. In this manner, fluid flow is generated by a pressure differential through the first passageway 302a to cause air in the first wheel well 114a to flow toward and exhaust from the first outlet 306a into the atmosphere. The first inlet 304a of FIG. 3 has a circular cross-sectional shape and the first outlet 306a of FIG. 3 has a trapezoidal cross-sectional shape.

The second thermal control system 300b and the third thermal control system 300c are substantially similar to the first thermal control system 300a. For example, the second thermal control system 300b includes a second passageway 302b between a second inlet 304b and a second outlet 306b. The second inlet 304b is positioned in fluid communication with the second wheel well 120b and the second outlet 306b is in fluid communication with the atmosphere. Specifically, the second outlet 306b is formed on the upper surface 112 of the second wing 106b of the aircraft 100. To exhaust or remove heat from the second wheel well 120b, a pressure differential is generated between the second inlet 304b and the second outlet 306b. Specifically, the second outlet 306b is formed on the airfoil 104 at location that has a pressure (e.g., a local pressure along a boundary line) that is less than a pressure of air inside the second wheel well 120b. Thus, the pressure differential between air pressure at the second inlet 304b and air pressure at the second outlet 306b induces fluid flow (e.g., a suction or vacuum) to exhaust heat from the second wheel well 120b to the atmosphere.

Similarly, the third thermal control system 300c includes a third passageway 302c between a third inlet 304c and a third outlet 306c. The third inlet 304c is positioned in fluid communication with the third wheel well 120c and the third outlet 306c is in fluid communication with the atmosphere via the first outlet 306a and/or the second outlet 306b. For example, the third outlet 306c is fluidly coupled to the first outlet 306a via a first auxiliary passageway 308a and the second outlet 306b via a second auxiliary passageway 308b. To exhaust or remove the heat from the third wheel well 120c, a pressure differential is generated between the third inlet 304c and the third outlet 306c. Thus, the pressure differential between air pressure at the third inlet 304c and air pressure at the third outlet 306c induces fluid flow (e.g., a suction or vacuum) to exhaust heat from the third wheel well 120c to the atmosphere (e.g., via the first outlet 306a and/or the second outlet 306b). The first thermal control system 300a, the second thermal control system 300b and third thermal control system 300c operate independently from each other. Although each of the wheel wells 120a-b include respective thermal control systems 102a-b, in some examples, only the first wheel well 120a and the second wheel well 120b include the respective thermal control systems 102a-b and the third wheel well 120c does not include the thermal control system 102c.

Figure 4A:
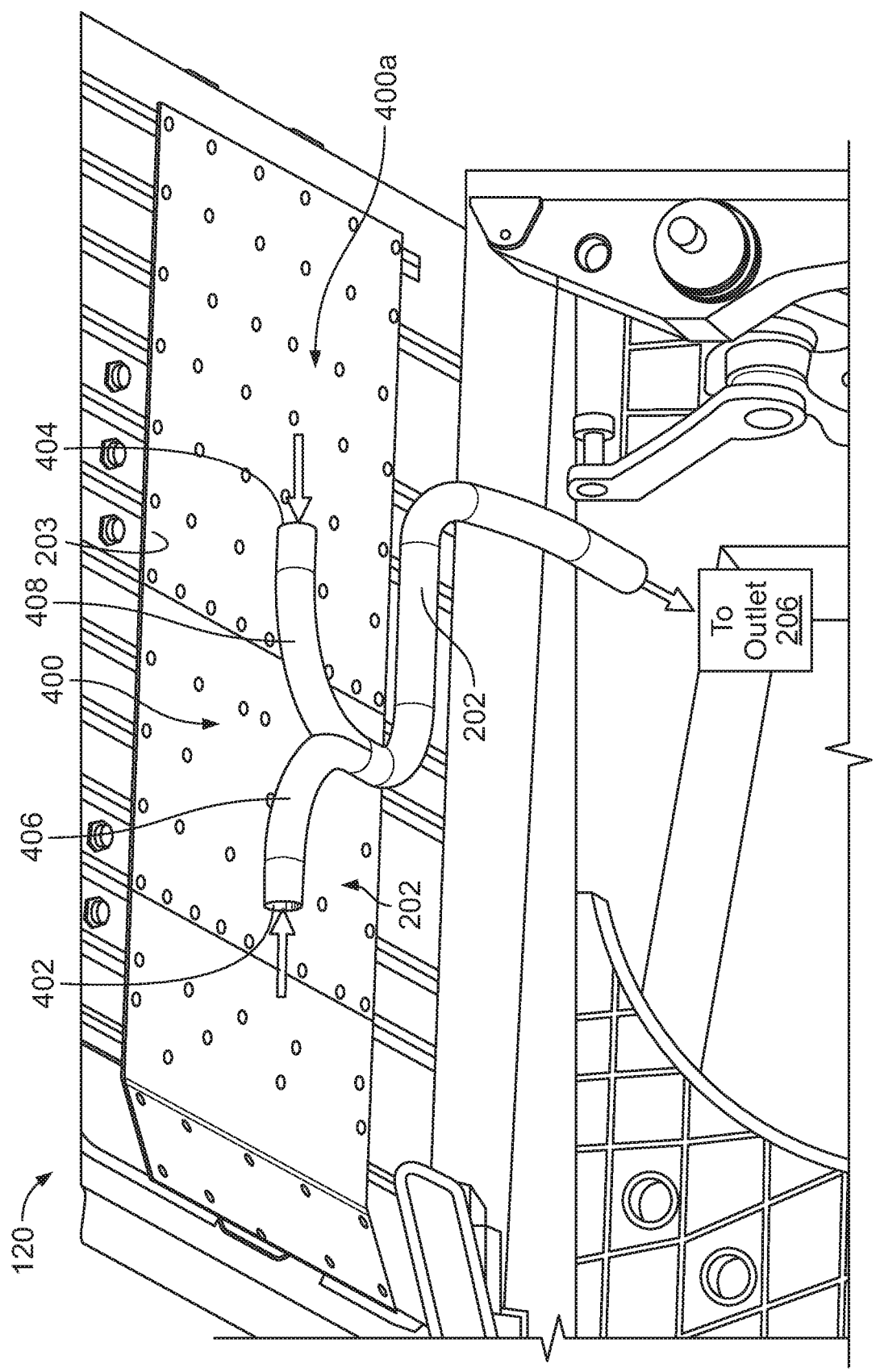
FIGS. 4A-4C illustrate an example thermal control system disclosed herein.
Figure 4B:
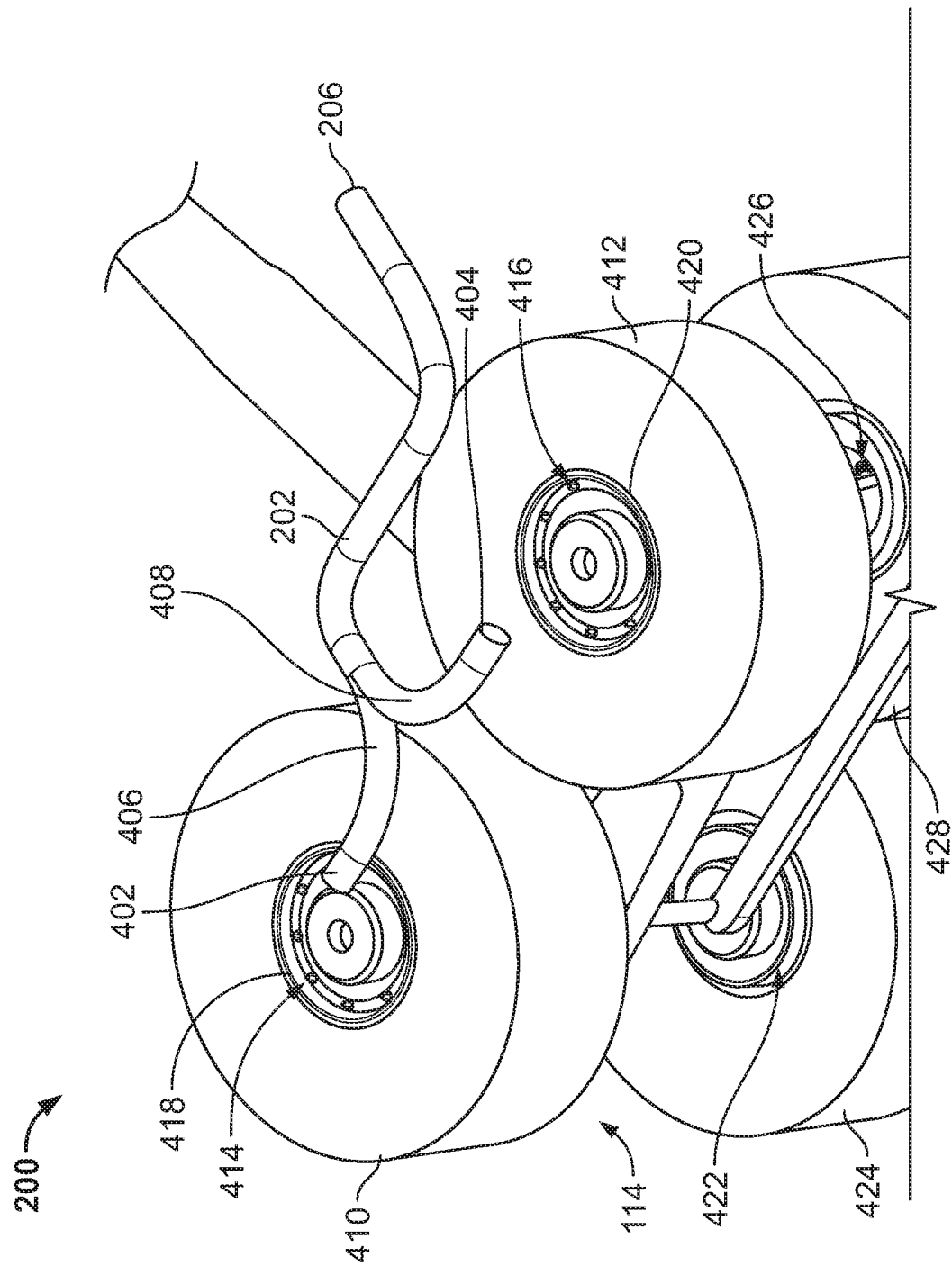
Figure 4C:
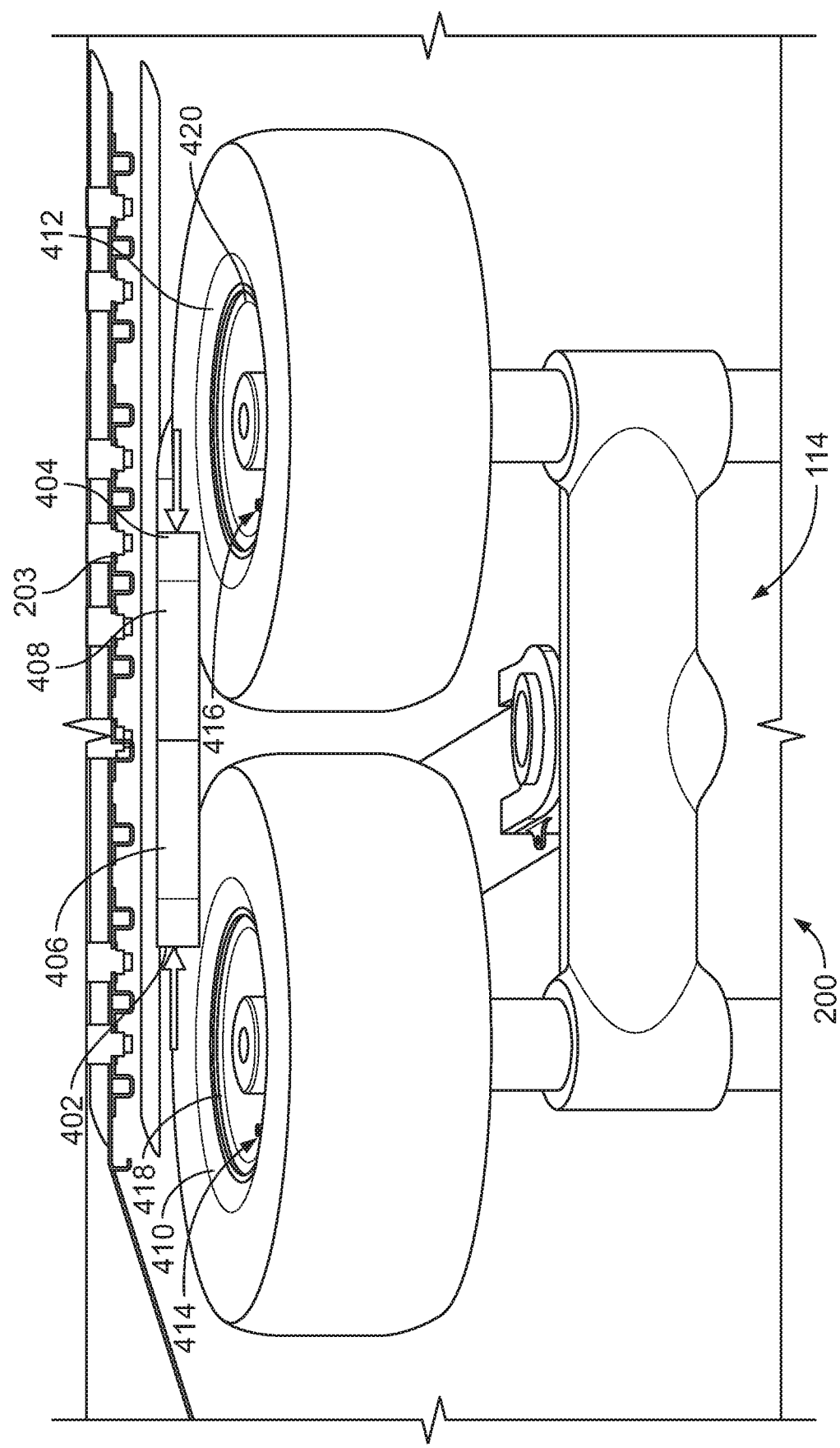

FIGS. 4A-4C illustrate an example thermal control system 400 disclosed herein. Those components of the thermal control system 400 of FIG. 4 that are substantially similar or identical to the components of the thermal control system 102 described above and that have functions substantially similar or identical to the functions of those components will not be described in detail again below. Instead, the interested reader is referred to the above corresponding descriptions. To facilitate this process, similar reference numbers will be used for like structures. For example, the thermal control system 400 of FIG. 4 includes a ventilation system 400a having a fluid passageway 202, the inlet 204 and an outlet 206.

FIG. 4A is a perspective view of a wheel well 120 implemented with the thermal control system 400 of FIG. 4. FIG. 4B is a perspective view of the thermal control system 400 relative to a landing gear 114 when the landing gear 114 is in a retracted position 200. FIG. 4C is a front view of the wheel well 120 of FIG. 2A shown with the landing gear 114 in the retracted position 200.

Referring to FIGS. 4A-4C, the inlet 204 of the thermal control system 400 includes a first inlet 402 and a second inlet 404. The first inlet 402 and the second inlet 404 are fluidly coupled to the outlet 206 via the fluid passageway 202. The first inlet 402 is defined by a first extension 406 (e.g., a first conduit) and the second inlet 404 is defined by a second extension 408 (e.g., a second conduit). For example, the first extension 406 and the second extension 408 are located or positioned in a perimeter of a thermal protection plate 203. Specifically, the first inlet 402 is oriented in a direction away from an orientation of the second inlet 404. The first inlet 402 is positioned adjacent (e.g., immediately adjacent and/or above) a first wheel 410 of the landing gear 114 and the second inlet 404 is positioned adjacent (e.g., immediately adjacent and/or above) a second wheel 412 of the landing gear 114. In particular, the first inlet 402 is positioned over a first brake 414 of the first wheel 410 and the second inlet 404 is positioned over a second brake 416 of the second wheel 412. For example, the first inlet 402 overlaps the first brake 414 such that the first inlet 402 extends within a perimeter of a first rim 418 of the first wheel 410 and the second inlet 404 overlaps the second brake 416 of the second wheel 412 such that the second inlet 404 extends within a perimeter of a second rim 420 of the second wheel 412. In this manner, heat generated by the first brake 414 exhausts to the outlet 206 via the first inlet 402 and heat generated by the second brake 416 exhausts to the outlet 206 via the second inlet 404 when a pressure differential generated through the fluid passageway 202 induces a fluid flow (e.g., a suction or vacuum) from the first inlet 402 and the second inlet 404 to the outlet 206. The first inlet 402 and/or the first extension 406 and the second inlet 404 and/or the second extension 408 merge with the fluid passageway 202 (e.g., a main conduit) upstream from the outlet 206. Thus, the first inlet 402 and the second inlet 404 are in fluid communication with the outlet 206.

The landing gear 114 of FIGS. 4A-4C includes a third wheel 424 positioned in alignment (e.g., vertical alignment) and below the first wheel 410 and a fourth wheel 428 positioned in alignment (e.g., vertical alignment) and below the second wheel 412. Heat generated by a third brake 422 of the third wheel 424 of the landing gear 114 and heat generated by a fourth brake 426 of the fourth wheel 428 of the landing gear 114 (e.g., rises and) exhausts via the first inlet 402 and/or the second inlet 404. In some examples, the thermal control system 400 can include a third inlet (e.g., via a third extension) positioned adjacent (e.g., immediately adjacent) the third brake 422 and/or the third wheel 424 and/or a fourth inlet (e.g., via a fourth extension) positioned adjacent (e.g., immediately adjacent) the fourth brake 426 and/or the fourth wheel 428.

Figure 5:
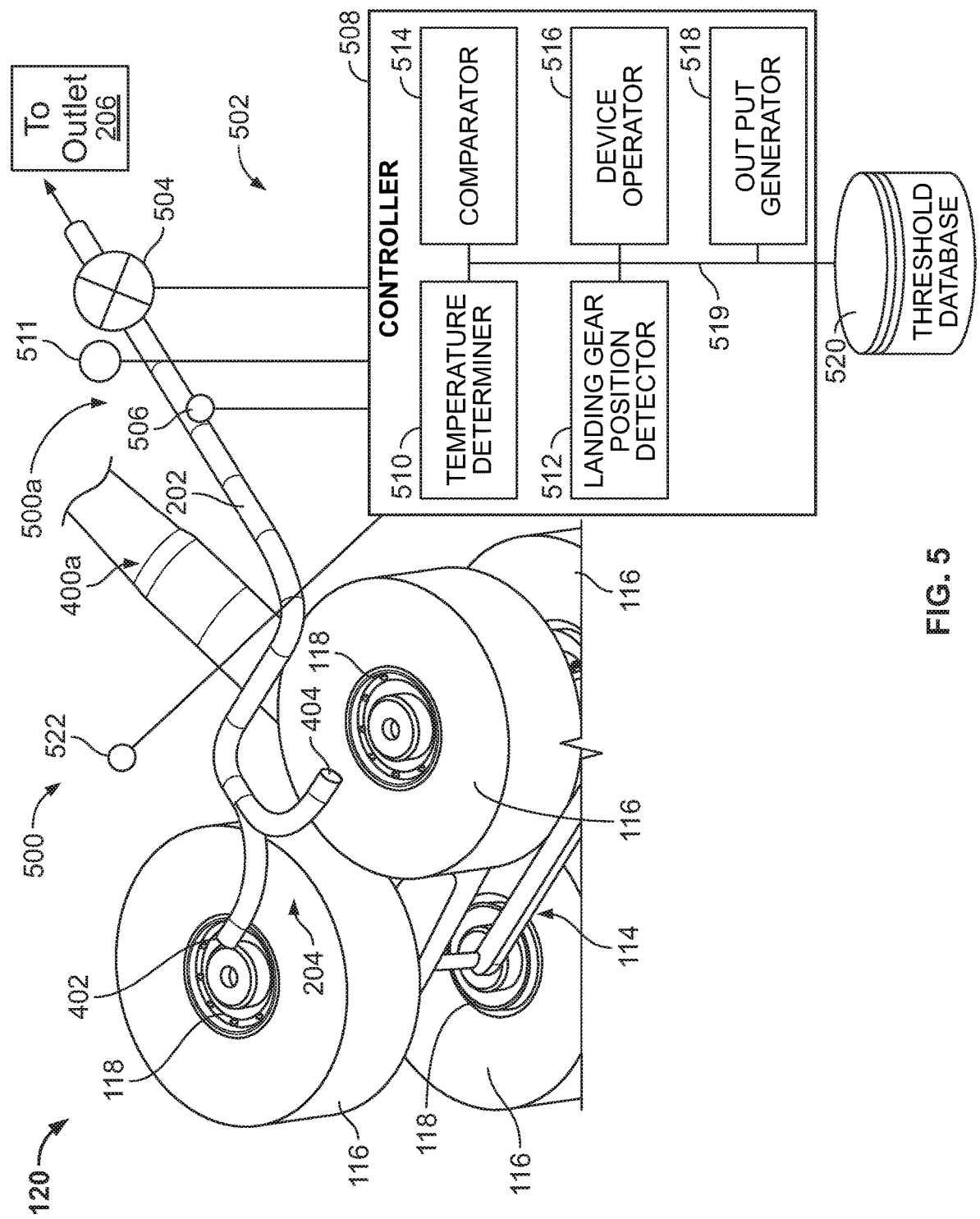
FIG. 5 is a perspective view of another example thermal control system disclosed herein.

FIG. 5 is a perspective view of another example thermal control system 500 disclosed herein. Those components of the thermal control system 500 of FIG. 5 that are substantially similar or identical to the components of the thermal control system 102 and the thermal control system 400 described above and that have functions substantially similar or identical to the functions of those components will not be described in detail again below. Instead, the interested reader is referred to the above corresponding descriptions. To facilitate this process, similar reference numbers will be used for like structures. For example, the thermal control system 500 includes a ventilation system 500a including a fluid passageway 202 fluidly coupling an inlet 204 (e.g., a first inlet 402 and a second inlet 404) to an outlet 206 to ventilate heat from the brakes 118 of the wheels 116 located in the wheel well 120 via the outlet 206.

Additionally, the thermal control system 500 of FIG. 5 includes a shut-off system 502. The shut-off system 502 prevents or restricts fluid flow between the inlet 204 (e.g., the first inlet 402 and the second inlet 404) and the outlet 206 when a temperature of the fluid (e.g., air) flowing through the fluid passageway 202 does not exceed an operating temperature threshold (e.g., a first temperature threshold). In this manner, fluid flow to the outlet 206 via the fluid passageway 202 can be reduced or prevented (e.g., shut-off) when a temperature in the wheel well 120 does not exceed the operating temperature threshold. Preventing or reducing fluid flow through the outlet 206 reduces drag that may otherwise be generated by fluid exiting the outlet 206. Thus, the thermal control system 500 operates between an activated condition and a deactivated condition. For example, the thermal control system 500 activates when a temperature in the wheel well 120 exceeds the operating temperature threshold and deactivates when a temperature in the wheel well 120 does not exceed the operating temperature threshold. In some examples, the activated condition modulates or varies fluid flow to reduce drag during operation.

The shut-off system 502 of FIG. 5 includes a fluid valve 504, a temperature sensor 506 and a controller 508. The fluid valve 504 can be a check valve, a shut-off valve, a control valve, and/or any other valve(s). The temperature sensor 506 can be a temperature probe, and/or any other sensor for measuring temperature of fluid flowing through the fluid passageway 202. The controller 508 of FIG. 5 is communicatively coupled to the fluid valve 504 and the temperature sensor 506. Additionally, the controller 508 can be communicatively coupled to a position sensor 511 to detect the landing gear 114 in the retracted position 200. For example, the position sensor 511 can be a proximity sensor and/or any other sensor that determines when the landing gear 114 moves from the extended position 115 to the retracted position 200.

To operate the fluid valve 504 based on a temperature in the wheel well 120, the shut-off system 502 includes the controller 508. The controller 508 includes a temperature determiner 510, a landing gear position detector 512, a comparator 514, a device operator 516, and an output generator 518. The temperature determiner 510, the landing gear position detector 512, the comparator 514, the device operator 516 and the output generator 518 are communicatively coupled via a bus 519. Additionally, the controller 508 is communicatively coupled to a threshold database 520 (e.g., via the bus 519).

The controller 508 operates the fluid valve 504 between an on/off position to allow or prevent fluid flow through the fluid passageway 202 based on an air temperature measured by the temperature sensor 506. In some examples, the controller 508 operates the fluid valve 504 between various open positions (e.g., one or more positions between a fully open position and a fully closed position) to adjust or vary (e.g., increase or decrease) fluid flow through the passageway based on a measured temperature value detected by the temperature sensor 506.

The controller 508 determines when the landing gear 114 is in the retracted position 200. For example, the controller 508 can be configured to receive a signal (e.g., a binary signal) from the position sensor 511 (e.g., a proximity sensor, etc.) indicative of the landing gear 114 being in the retracted position 200. Alternatively, the controller 508 can receive one or more signals (e.g., binary signals) from a position sensor (e.g., a proximity sensor) that detects the landing gear doors 122 of the wheel well 120 in the closed position. In some examples, the controller 508 receives one or more signals from an engine controller, a full authority digital electronic controller (FADEC), and/or any other aircraft controller indicative of the landing gear 114 being in the retracted position 200 within the wheel well 120 and/or the aircraft 100 is in flight.

The controller 508 causes the fluid valve 504 to move to an open position to allow fluid flow between the inlet 204 and the outlet 206 in response to determining an air temperature in the wheel well 120 exceeds the operating temperature threshold (e.g., the first temperature threshold). In some examples, the controller 508 causes the fluid valve 504 to move to an open position to allow fluid flow between the inlet 204 and the outlet 206 in response to determining that the landing gear 114 is in the retracted position 200. Alternatively, the controller 508 can cause the fluid valve 504 to move to an open position in response to determining that the landing gear doors 122 of the wheel well 120 are in the closed position.

When the fluid valve 504 is in the open position, a pressure differential between the inlet 204 and the outlet 206 causes fluid to flow (e.g., ventilate) through the fluid passageway 202 from the inlet 204 to the outlet 206. For example, as noted above, a pressure differential established within the fluid passageway 202 (e.g., generates an airflow momentum that) causes or induces fluid flow from the inlet 204 to the outlet 206. As the fluid flows through the fluid passageway 202 towards the outlet 206, the temperature sensor 506 detects or measures a temperature of the fluid (e.g., heated air). The temperature sensor 506 sends one or more signals to the controller 508 representative of the measured temperature of the fluid flowing through the fluid passageway 202. Additionally or alternatively, the controller 508 can receive one or more signals from a temperature sensor 522 located in the wheel well 120. For example, the temperature sensor 522 measures a temperature of air inside the wheel well 120 and/or adjacent the wheels 116 of the landing gear 114.

In turn, the controller 508 controls (e.g., commands) operation of the fluid valve 504 based on a comparison of the measured temperature provided by the temperature sensor 506 and the operating temperature threshold stored in the threshold database 520. For example, the controller 508 retrieves, receives, and/or otherwise obtains the operating temperature threshold from the threshold database 520 communicatively coupled to the controller 508. The temperature determiner compares, via the comparator 514, the measured temperature value provided by the temperature sensor 506 and the operating temperature threshold obtain from the threshold database 520. The temperature determiner 510 determines whether the measured temperature value exceeds the operating temperature threshold (e.g. or does not exceed the temperature threshold). If the temperature determiner 510 determines that the measured temperature value from the temperature sensor 506 exceeds the operating temperature threshold, the device operator 516 commands the fluid valve 504 to move to the open position. If the temperature determiner 510 determines that the measured temperature from the temperature sensor 506 does not exceed the operating temperature threshold, the device operator 516 commands the fluid valve 504 to move to the closed position. Alternatively, the temperature determiner 510 compares the measured temperature value from the temperature sensor 522 and the operating temperature threshold. Alternatively, the temperature determiner 510 determines an average measured temperature valve based on a measured temperature value provided by the temperature sensor 506 (e.g., a temperature of the fluid flowing through the fluid passageway 202) and a measured temperature value provided by the temperature sensor 522 (e.g., a measured temperature value of the air inside the wheel well 120). In some examples, the controller 508 operates the fluid valve 504 based on the measured temperature value provided by the temperature sensor 522 in the wheel well 120. In some examples, the controller 508 adjusts a position of the fluid valve 504 between a fully open position and a fully closed position (e.g., a mid-point position) to adjust (e.g., increase, decrease, modulate, etc.) a fluid flow rate through the fluid passageway 202. The controller 508 can be a dedicated controller of the shut-off system 502. Alternatively, the controller 508 can be an electronic engine controller and/or other controller system(s) of the aircraft 100 (e.g., a full authority digital electronic controller (FADEC)).

While an example manner of implementing the controller 508 of FIG. 5 is illustrated in FIG. 5, one or more of the elements, processes and/or devices illustrated in FIG. 5 may be combined, divided, re-arranged, omitted, eliminated and/or implemented in any other way. Further, the example temperature determiner 510, the example landing gear position detector 512, the example comparator 514, the example device operator 516 and the example output generator 518 and/or, more generally, the example controller 508 of FIG. 5 may be implemented by hardware, software, firmware and/or any combination of hardware, software and/or firmware. Thus, for example, any of—the example temperature determiner 510, the example landing gear position detector 512, the example comparator 514, the example device operator 516 and the example output generator 518 and/or, more generally, the example controller 508 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example temperature determiner 510, the example landing gear position detector 512, the example comparator 514, the example device operator 516 and the example output generator 518 is/are hereby expressly defined to include a non-transitory computer readable storage device or storage disk such as a memory, a digital versatile disk (DVD), a compact disk (CD), a Blu-ray disk, etc. including the software and/or firmware. Further still, the example controller 508 of FIG. 5 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
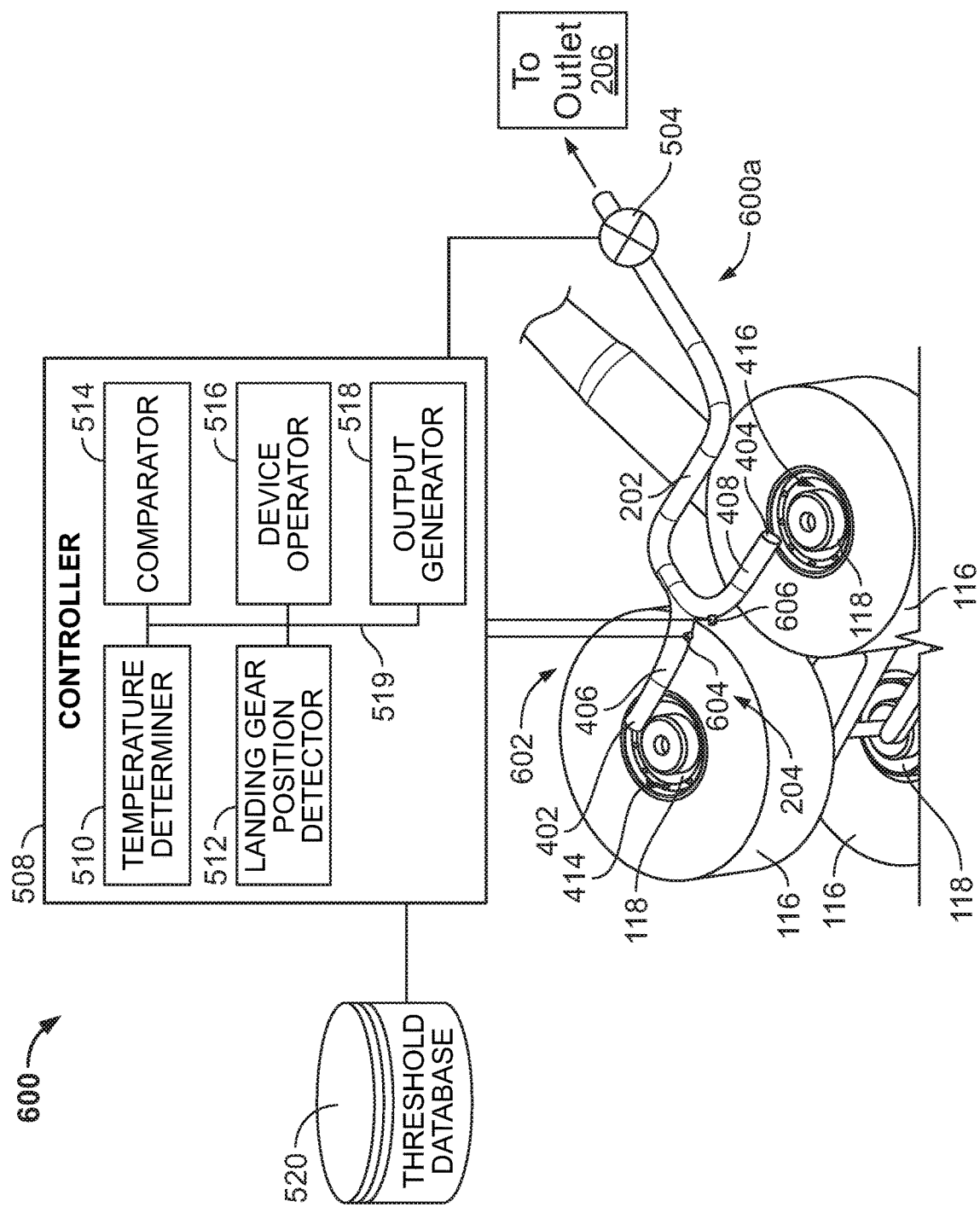
FIG. 6 is a perspective view of another example thermal control system disclosed herein.

FIG. 6 is a perspective view of another example thermal control system 600 disclosed herein. Those components of the thermal control system 600 of FIG. 6 that are substantially similar or identical to the components of the thermal control system 500, the thermal control system 400 and the thermal control system 102 described above and that have functions substantially similar or identical to the functions of those components will not be described in detail again below. Instead, the interested reader is referred to the above corresponding descriptions. To facilitate this process, similar reference numbers will be used for like structures. For example, the thermal control system 600 includes a ventilation system 600a and a brake overheat detection system 602. The ventilation system 600a includes a fluid passageway 202 fluidly coupling an inlet 204 (e.g., a first inlet 402 and a second inlet 404) to an outlet 206 to ventilate heat from the brakes 118 of the wheels 116 located in the wheel well 120 via the outlet 206.

The thermal control system 600 of FIG. 6 includes a brake overheat detection system 602. The brake overheat detection system 602 monitors temperatures of the brakes 118 (e.g., the first brake 414 and the second brake 416) of the wheels to determine a brake overheat condition. To monitor the temperature of the brakes, the thermal control system 600 of FIG. 6 includes a first brake sensor 604 and a second brake sensor 606. The first brake sensor 604 is coupled to the first extension 406 and the second brake sensor 606 is coupled to the second extension 408. The first brake sensor 604 measures a temperature of fluid entering the first inlet 402 and the second brake sensor 606 measures a temperature of fluid entering the second inlet 404. Thus, the first brake sensor 604 and/or the second brake sensor 606 can be a temperature probe and/or any other sensor for measuring a temperature of fluid (e.g., air) flowing through the first inlet 402 and/or the second inlet 404. In some examples, the brake overheat detection system 602 includes a single brake sensor positioned downstream from the inlet 204 (e.g., the first inlet 402 and the second inlet 404). In some examples, such as the example thermal control system 102 of FIGS. 2A-2C, the brake overheat detection system 602 includes a single brake sensor. In some examples, the brake overheat detection system 602 can be provided in conjunction with the shut-off system 502 of FIG. 5. When implemented with the shut-off system 502 of FIG. 5, the temperature sensor 506 can be located downstream from the first brake sensor 604 and the second brake sensor 606.

To monitor a temperature of the brakes 118 of the wheels 116, the brake overheat detection system 602 includes a controller 508. The controller 508 receives a first measured temperature value from the first brake sensor 604 and receives a second measured temperature value from the second brake sensor 606. The controller 508, via the comparator 514, compares the first measured temperature value from the first brake sensor 604 to a brake temperature threshold (e.g., a second temperature threshold) obtained from the threshold database 520. For example, the brake temperature threshold can be between approximately 200° F. and 400° F. Likewise, the controller 508, via the comparator 514, compares the second measured temperature value from the second brake sensor 606 to the brake temperature threshold. The controller 508, via the temperature determiner 510, determines if the first measured temperature value or the second measured temperature value exceeds the brake temperature threshold (e.g., or does not exceed the brake temperature threshold).

In response to determining that at least one of the first brake temperature value or the second brake temperature value exceeds the brake temperature threshold, the controller 508, via the device operator 516, moves the fluid valve 504 to the closed position to prevent fluid flow through the fluid passageway 202. In some examples, the controller 508, via the output generator 518, can send a signal to activate an alert at a panel of a cockpit (e.g., a flight deck) located in the fuselage 108 of the aircraft 100 (FIG. 1). The aircrew operating the aircraft 100 can activate (e.g., manually activate) the landing gear 114 to the deployed position 115. Alternatively, the controller 508, via the device operator 516 or the output generator 518, can cause the landing gear 114 to move to the deployed position 115 (e.g., automatically without aircrew input).

In some examples, the first brake sensor 604 and the second brake sensor 606 can be used to operate the fluid valve 504. For example, temperature measurements from the first brake sensor 604 and/or the second brake sensor 606 can be used to determine if the air temperature in the fluid passageway 202 exceeds an operating temperature threshold (e.g., the first temperature threshold). Thus, the controller 508 can cause the fluid valve 504 to move to the closed position in response to determining that the measured temperature value does not exceed the operating temperature threshold and can cause the fluid valve 504 to move or remain in an open position in response to determining that the measured temperature value exceeds the temperature threshold and does not exceed the brake temperature threshold. In other words, thermal control system 700 does not require the temperature sensor 506 of FIG. 5 to control the fluid valve 504 during normal operating conditions (i.e., when the air temperature in the fluid passageway 202 does not exceed the brake temperature threshold). In some such examples, the thermal control system 600 can operate between a sniffer mode when the controller 508 detects that the measured air temperature does not exceed the operating temperature threshold (e.g., the first threshold) and a ventilation mode when the controller 508 determines that the measured air temperature exceeds the operating threshold and does not exceed the brake temperature threshold (e.g., a second threshold). In the sniffer mode, the controller 508 causes the fluid valve 504 to open between 1 percent and 15 percent of a fully open position. In the ventilation mode, the controller 508 causes the fluid valve 504 to move to open position between 20 percent and 100 percent of a fully open position. As a result, the thermal control system 600 can optimize drag by reducing fluid flow through the fluid passageway 202 when ventilation conditions (e.g., high temperature conditions exceeding the operating temperature threshold) are not required.

Figure 7:
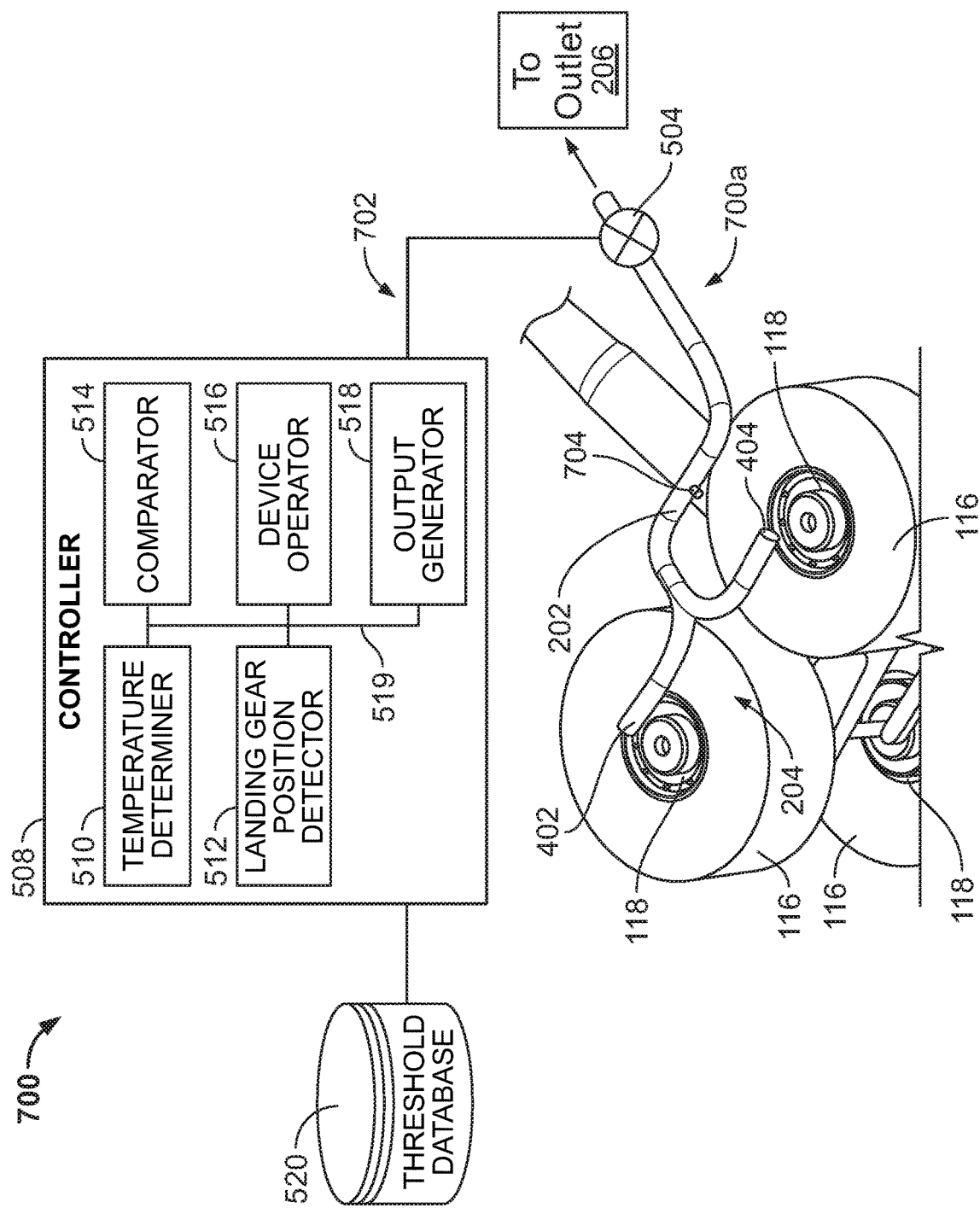
FIG. 7 is a perspective view of another example thermal control system disclosed herein.

FIG. 7 is a perspective view of another example thermal control system 700 disclosed herein. Those components of the thermal control system 700 of FIG. 7 that are substantially similar or identical to the components of the thermal control system 500, the thermal control system 400 and the thermal control system 102 described above and that have functions substantially similar or identical to the functions of those components will not be described in detail again below. Instead, the interested reader is referred to the above corresponding descriptions. To facilitate this process, similar reference numbers will be used for like structures. For example, the thermal control system 700 includes a ventilation system 700a including a fluid passageway 202 fluidly coupling an inlet 204 (e.g., a first inlet 402 and a second inlet 404) to an outlet 206 to ventilate heat from the brakes 118 of the wheels 116 located in the wheel well 120 via the outlet 206.

Additionally, the thermal control system 700 of FIG. 7 includes a fire detection system 702. The fire detection system 702 monitors a temperature of fluid flowing through the fluid passageway 202 to detect a fire condition. To monitor for a fire condition, the thermal control system 700 of FIG. 7 includes a fire sensor 704 and a controller 508. The fire sensor 704 is coupled to the fluid passageway 202 and measures a temperature of fluid flowing through (i.e., inside) the fluid passageway 202. In some examples, the fire detection system 702 can be provided in conjunction with the brake overheat detection system 602 of FIG. 6 and/or the shut-off system 502 of FIG. 5. When implemented with the brake overheat detection system 602 of FIG. 6 and the shut-off system 502 of FIG. 5, the fire sensor 704 can be located upstream from the temperature sensor 506 of FIG. 5 and downstream from the first brake sensor 604 and the second brake sensor 606.

The controller 508 receives a measured temperature value from the fire sensor 704 and compares, via the comparator 514, the measured temperature value to a fire temperature threshold (e.g., a third threshold) obtained from the threshold database 520. The controller 508, via the temperature determiner 510, determines if the measured temperature value exceeds the fire temperature threshold (e.g., or does not exceed the fire temperature threshold). In response to determining that the measured temperature value exceeds the fire temperature threshold, the controller 508, via the output generator 518, sends a signal to activate an alert at a panel of a cockpit. The aircrew operating the aircraft 100 can activate (e.g., manually activate) the landing gear 114 to the deployed position 115. Alternatively, the controller 508, via the output generator 518, can cause the landing gear 114 to move to the deployed position 115. In some examples, the controller 508, via the output generator 518, causes a fluid valve 504 (e.g., a shut-off valve) to move to a closed position to prevent fluid flow through the fluid passageway 202.

In some examples, the fire sensor 704 can be used to operate the fluid valve 504. For example, temperature measurements from the fire sensor 704 can be used to determine if the air temperature in the fluid passageway 202 exceeds an operating temperature threshold (e.g., the first temperature threshold). Thus, the controller 508 can cause the fluid valve 504 to move to the closed position in response to determining that the measured temperature value does not exceed the operating temperature threshold and can cause the fluid valve 504 to move or remain in an open position in response to determining that the measured temperature value exceeds the temperature threshold and does not exceed the fire temperature threshold. In other words, the thermal control system 700 does not require the temperature sensor 506 of FIG. 5 to control the fluid valve 504 during normal operating conditions (i.e., when the air temperature in the fluid passageway 202 does not exceed the fire temperature threshold). In some such examples, the thermal control system 700 can operate between a sniffer mode when the controller 508 detects that the measured air temperature does not exceed the operating temperature threshold (e.g., the first threshold) and a ventilation mode when the controller 508 determines that the measured air temperature exceeds the operating threshold and does not exceed the fire temperature threshold (e.g., a third threshold). In the sniffer mode, the controller 508 causes the fluid valve 504 to open between 1 percent and 15 percent of a fully open position. In the ventilation mode, the controller 508 causes the fluid valve 504 to move to open position between 20 percent and 100 percent of a fully open position. As a result, the thermal control system 700 can optimize drag by reducing fluid flow through the fluid passageway 202 when ventilation conditions (e.g., high temperature conditions exceeding the operating temperature threshold) are not required.

FIG. 8 is a perspective view of another example thermal control system 800 disclosed herein. Those components of the thermal control system 800 of FIG. 8 that are substantially similar or identical to the components of the thermal control system 500, the thermal control system 400 and the thermal control system 102 described above and that have functions substantially similar or identical to the functions of those components will not be described in detail again below. Instead, the interested reader is referred to the above corresponding descriptions. To facilitate this process, similar reference numbers will be used for like structures. For example, the thermal control system 800 includes a ventilation system 800a including a fluid passageway 202 fluidly coupling an inlet 204 (e.g., a first inlet 402 and a second inlet 404) and an outlet 802.

To generate a pressure differential in the fluid passageway 202 and induce fluid flow from the inlet 204 towards the outlet 802, the thermal control system 800 of FIG. 8 includes a flow generator 804. For example, the flow generator 804 generates a suction or vacuum to ventilate or remove heat from the brakes 118 of the wheels 116 located in the wheel well 120 via the outlet 802. The flow generator 804 is positioned in-line with the fluid passageway 202 downstream from the inlet 204 and upstream from the outlet 802. The flow generator 804 of FIG. 8 can be a blower, a pump, a fan, a vacuum and/or any device to draw in fluid from the inlet 204 to ventilate heat from the brakes 118 (i.e., ventilate air from the wheel well 120) to the outlet 802 via the fluid passageway 202. Additionally, the outlet 802 can be positioned at any desired location. For example, unlike the outlet 206 of the thermal control system 102, a pressure differential through the fluid passageway 202 is not dependent on a location of the outlet 802 adjacent a low pressure area. For example, the outlet 802 can be located on a lower surface 110 (FIG. 1) of an airfoil 104 (FIG. 1) and/or any other location within the airfoil 104 and/or the fuselage 108 (e.g., a compartment, an aircraft system, etc.), external of the airfoil 104 and/or the fuselage 108, and/or any other location. In some examples, the thermal control system 800 can include the shut-off system 502 of FIG. 5, the brake overheat detection system 602 of FIG. 6, and/or the fire detection system 702 of FIG. 7. In some examples, the outlet 802 can be routed to a cavity of the first wing 106a or the second wing 106b and/or can be routed to other systems of the aircraft that require heated air.

A controller 508, via a device operator 516, can control an operation (e.g., on/off operation, a speed, etc.) of the flow generator 804 to activate or deactivate the thermal control system 800 and/or to vary or adjust (e.g., increase, decrease) a fluid velocity through the fluid passageway 202. The thermal control system 800 can receive one or more signals from a position sensor (e.g., the position sensors 511 and/or 522 of FIG. 5) and/or a temperature sensor (e.g., the temperature sensor 506 of FIG. 5, the first brake sensor 604 and the second brake sensor 606 of FIG. 6, the fire sensor 704 of FIG. 7, etc.) to control an operation of the flow generator 804 to activate or deactivate the thermal control system 800. For example, the controller 508 can activate the flow generator 804 to cause airflow through the fluid passageway 202 to ventilate the wheel well 120 or deactivate the flow generator 804 to prevent airflow through the fluid passageway 202 to prevent fluid flow to the outlet 802. The controller 508 activates and deactivates the thermal control system 800 based on a temperature of fluid flowing through the fluid passageway 202 and/or a temperature in the wheel well 120 as described in connection with FIG. 5.

FIG. 9 is a perspective view of another example thermal control system 900 disclosed herein. Those components of the thermal control system 900 of FIG. 9 that are substantially similar or identical to the components of the thermal control system 500, the thermal control system 400 and the thermal control system 102 described above and that have functions substantially similar or identical to the functions of those components will not be described in detail again below. Instead, the interested reader is referred to the above corresponding descriptions. To facilitate this process, similar reference numbers will be used for like structures. For example, the thermal control system 900 includes a ventilation system 900a including a fluid passageway 202 fluidly coupling an inlet 204 (e.g., a first inlet 402 and a second inlet 404) and an outlet 802.

To generate a pressure differential in the fluid passageway 202 and induce fluid flow from the inlet 204 towards the outlet 802, the thermal control system 900 of FIG. 9 includes a flow generator 902. For example, the flow generator 902 generates a suction or vacuum to ventilate or remove heat from the brakes 118 of the wheels 116 located in the wheel well 120 via the outlet 802. The flow generator 902 of FIG. 9 is an eductor 904 that provides high pressure fluid 906 to the fluid passageway 202 of the thermal control system 900. For example, the high pressure fluid 906 is high pressure bleed air. The flow generator 902 includes an inlet 910 (e.g., an eductor inlet) to receive the high pressure fluid 906 and provides (e.g., injects) the high pressure bleed air from an engine aircraft compressor (e.g., a high pressure compressor, a low pressure compressor, etc.) in the fluid passageway 202 downstream from the inlet 204 and upstream from the outlet 802. Momentum of the high pressure bleed air flowing in the fluid passageway 202 via the inlet 910 generates a vacuum or suction at the inlet 204 of the fluid passageway 202 to ventilate heat (e.g., air) from the brakes 118 of the wheels 116 in the wheel well 120 to the outlet 802 via the fluid passageway 202. In other examples, the high pressure fluid 906 can be provided by a compressor and/or any other system of the aircraft 100. In some examples, the thermal control system 900 can include the shut-off system 502 of FIG. 5, the brake overheat detection system 602 of FIG. 6, the fire detection system 702 of FIG. 7.

A controller 508, via a device operator 516, controls a fluid valve 908 (e.g., a fluid valve, a shut-off valve, etc.) to activate or deactivate the thermal control system 900. For example, the controller 508 commands or causes the fluid valve 908 to move between an open position to allow high pressure fluid 906 to flow in the fluid passageway 202 and activate the thermal control system 900 and a closed position to prevent or restrict the high pressure fluid 906 to flow to the fluid passageway 202 to deactivate the thermal control system 900. For example, the thermal control system 900 can receive one or more signals from a position sensor (e.g., the position sensors 511 and/or 522 of FIG. 5) and/or a temperature sensor (e.g., the temperature sensor 506 of FIG. 5, the first brake sensor 604 and the second brake sensor 606 of FIG. 6, the fire sensor 704 of FIG. 7, etc.) to control the operation of fluid valve 908 to activate or deactivate the thermal control system 900. The controller 508 activates and deactivates the thermal control system 900 based on a temperature of fluid flowing through the fluid passageway 202 and/or a temperature in the wheel well 120 as described in connection with FIG. 5.

Figure 10A:
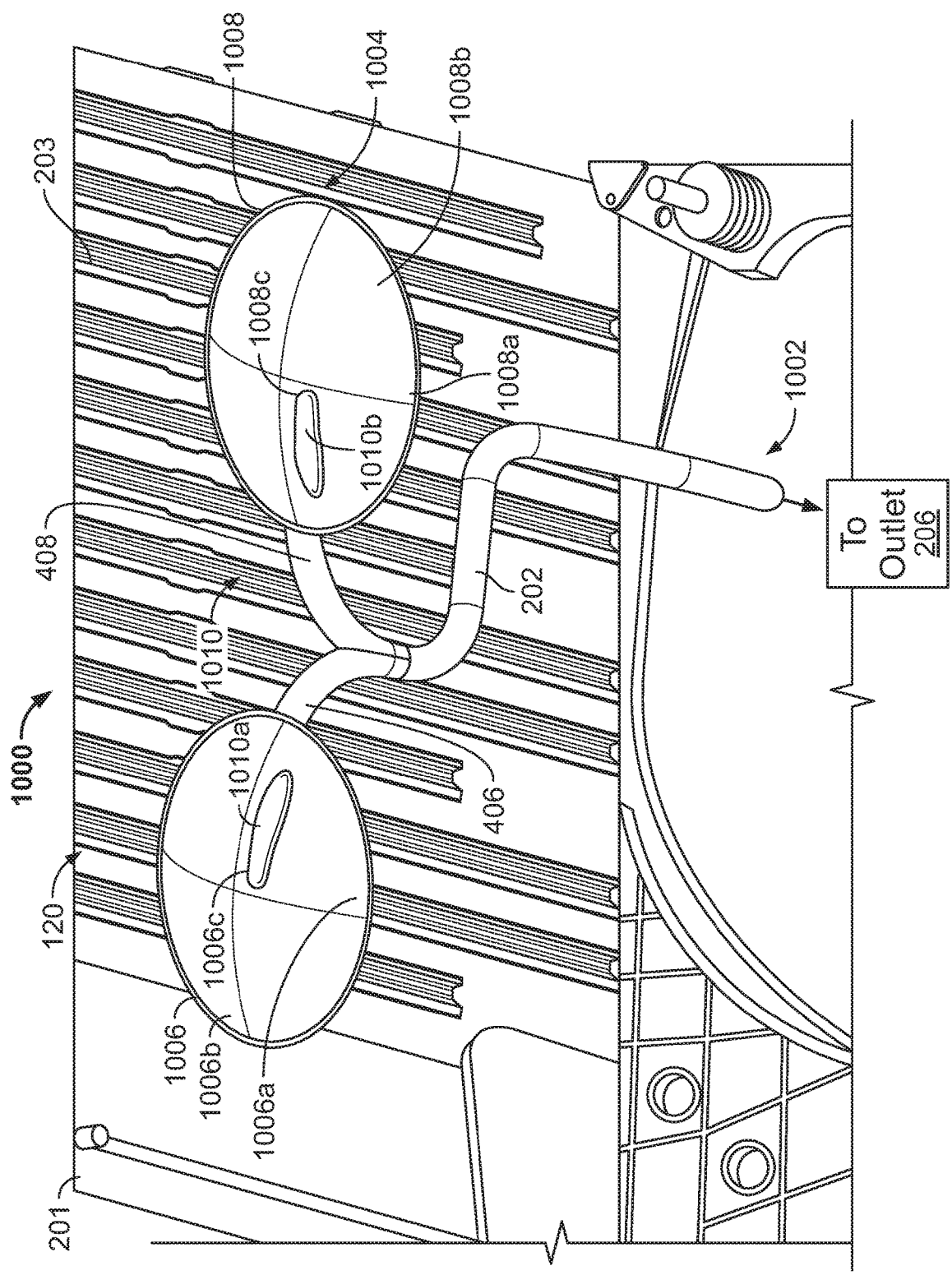
FIGS. 10A-10C illustrate another example thermal control system disclosed herein.
Figure 10B:
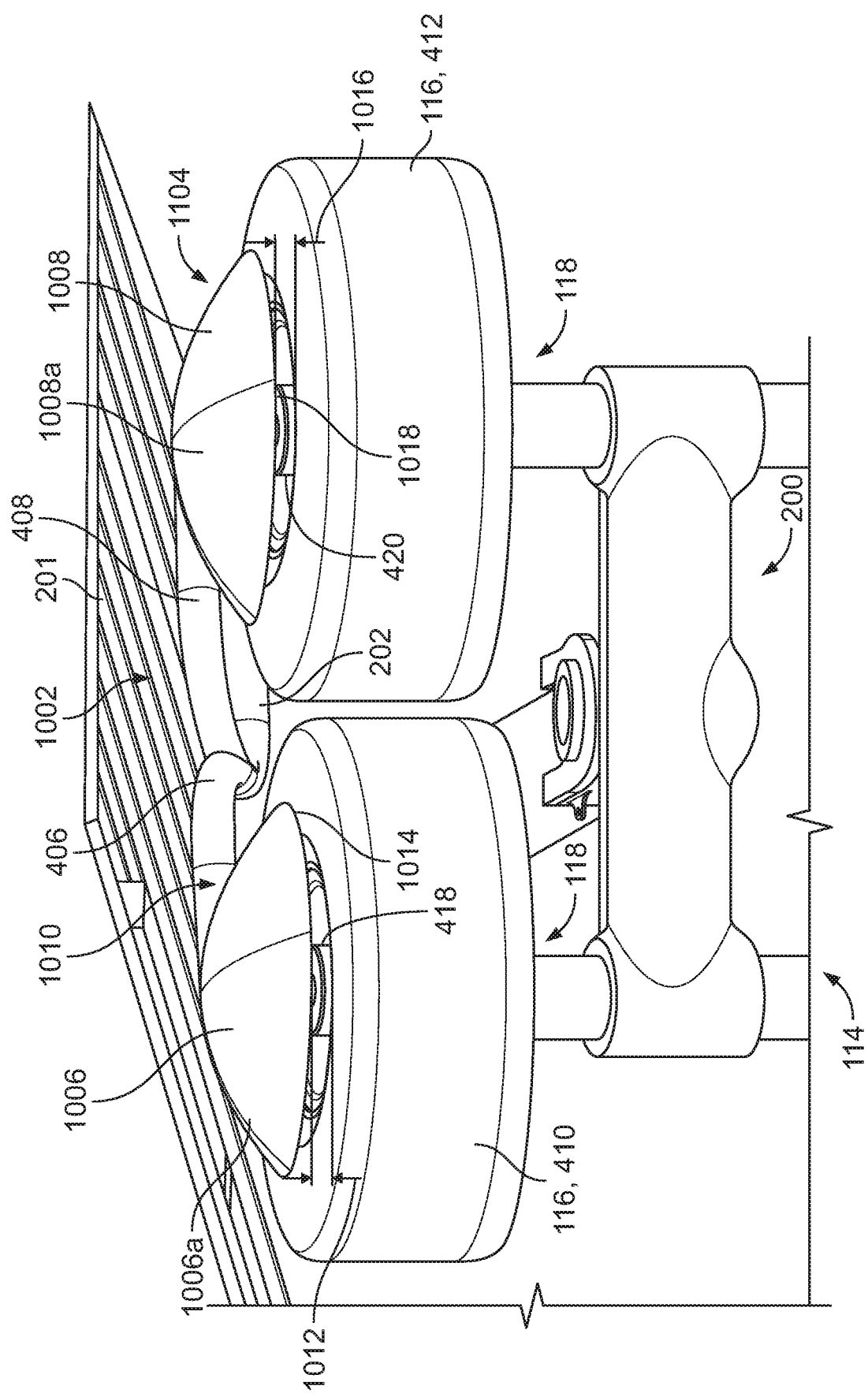
Figure 10C:
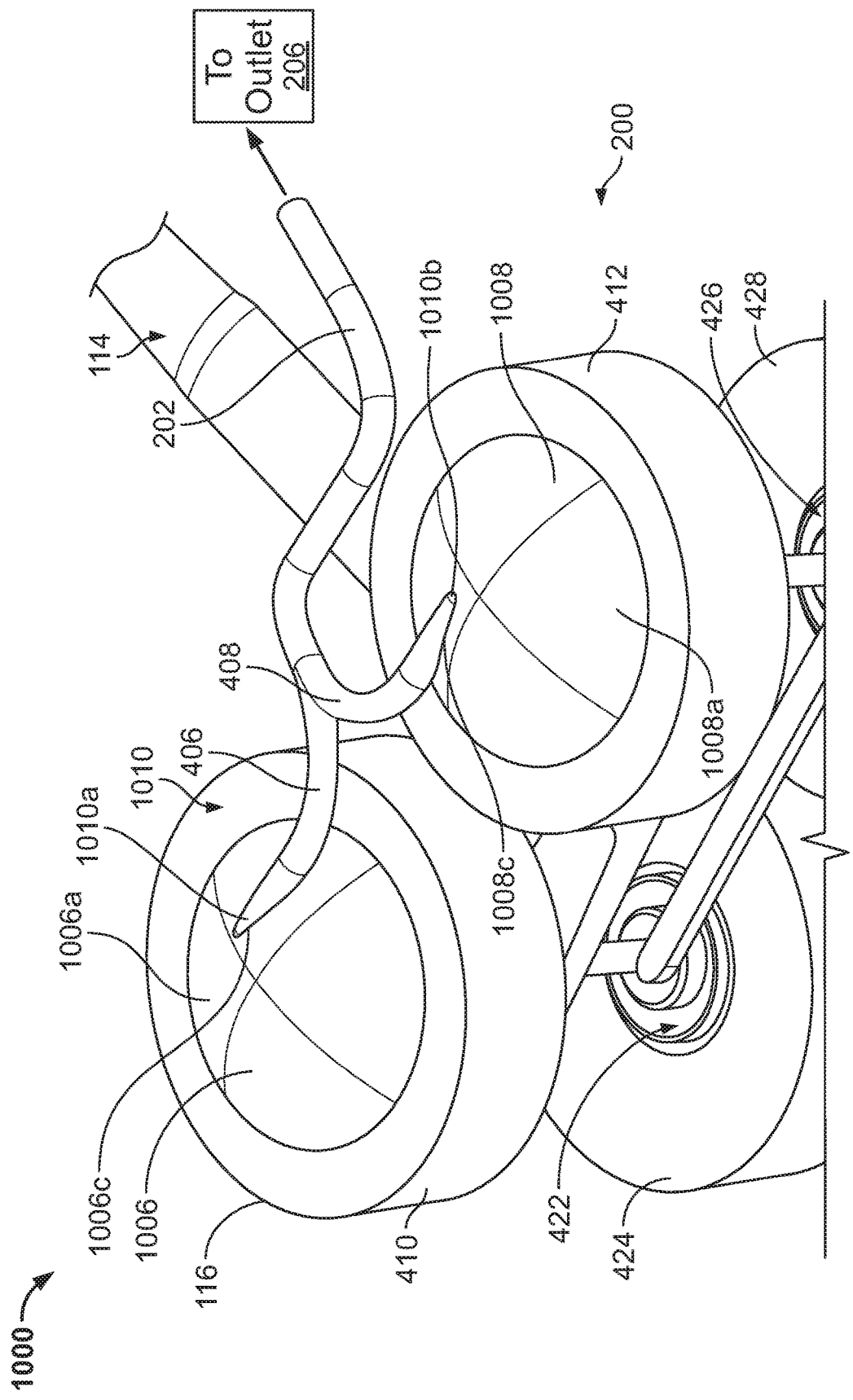

FIGS. 10A-10C illustrate another example thermal control system 1000 disclosed herein. Those components of the thermal control system 1000 of FIGS. 10A-10C that are substantially similar or identical to the components of the thermal control system 500, the thermal control system 400, and the thermal control system 102 described above and that have functions substantially similar or identical to the functions of those components will not be described in detail again below. Instead, the interested reader is referred to the above corresponding descriptions. To facilitate this process, similar reference numbers will be used for like structures.

FIG. 10A is a perspective view of the thermal control system 1000 in a wheel well 120 with a landing gear 114 in a deployed position 115 (FIG. 1). FIG. 10B is a front, perspective view of the wheel well 120 of FIG. 10A with the landing gear 114 in a retracted position 200. FIG. 10C is a perspective view of the thermal control system 1000 and the landing gear 114.

The thermal control system 1000 of FIGS. 10A-10C combines a ventilation system 1002 to reduce convective heat transfer to the primary structure 201 and/or components in the wheel well 120 and a heat shield system 1004 to reduce radiation heat transfer to the primary structure 201 and/or components in the wheel well 120. For example, the ventilation system 1002 of FIGS. 10A-10C includes a fluid passageway 202 to ventilate or exhaust heat from the brakes 118 of the wheels 116 in the wheel well 120, and a first diffusor 1006 and a second diffusor 1008 to block or reduce radiation heat transfer from the brakes 118 of the wheels 116. The first diffusor 1006 and the second diffusor 1008 enable removal of the thermal protection plate 203, thereby reducing aircraft weight and increasing aircraft efficiently. However, in some examples, a thermal protection plate (e.g., the thermal protection plate 203) can be provided with the thermal control system 1000.

The fluid passageway 202 fluidly couples an inlet 1010 and an outlet 206. The inlet 1010 includes a first inlet 1010a provided by a first extension 406 and a second inlet 1010b provided by a second extension 408. The first diffusor 1006 is coupled to the first inlet 1010a (e.g., the first extension 406) and the second diffusor 1008 is coupled to the second inlet 1010b (e.g., the second extension 408). The first diffusor 1006 has a first dome-shaped body 1006a (e.g., a hemisphere) and the second diffusor 1008 has a second dome-shaped body 1008a (e.g., a hemisphere). For example, the first diffusor 1006 and the second diffusor 1008 each has an arcuate shape (e.g., a disk shape) having a convex profile oriented in a direction away from the wheels 116. For example, the first dome-shaped body 1006a defines a first cavity 1006b having a first volume and the second dome-shaped body 1008a defines a second cavity 1008b having a second volume. The first diffusor 1006 is substantially similar (e.g., identical) to the second diffusor 1008. However, in some examples, the first diffusor 1006 can be configured to define a first volume that is different than (e.g., greater or less than by, for example, 10 to 20% of) a volume of the second diffusor 1008.

The first diffusor 1006 has a first opening 1006c to receive the first inlet 1010a and the second diffusor 1008 has a second opening 1008c to receive the second inlet 1010b. The first inlet 1010a and the second inlet 1010b are substantially similar to the respective first inlet 402 and the second inlet 404 of the thermal control system 400 of FIGS. 4A-C. However, the first inlet 1010a and the second inlet 1010b of the thermal control system 1000 each have a contour or shape (e.g., an oblong or arcuate shape) that is complementary to a shape of the first dome-shaped body 1006a and the second dome-shaped body 1008a, respectively. In other words, the first inlet 1010a has a shape or profile that substantially matches a contour of the first dome-shaped body 1006a of the first diffusor 1006 and the second inlet 1010b has a shape or profile that substantially matches a contour of the second dome-shaped body 1008a of the second diffusor 1008. In this manner, heat or air within the first cavity 1006b defined by the first dome-shaped body 1006a of the first diffusor 1006 does not leak from the first cavity 1006b to an exterior of the first dome-shaped body 1006a via the first opening 1006c, and/or heat or air within the second cavity 1008b of the second dome-shaped body 1008a of the second diffusor 1008 does not leak from the second cavity 1008b to an exterior of the second dome-shaped body 1008a via the second opening 1008c. Thus, the first and second inlets 1010a, 1010b each form an arcuate and/or oblong shaped opening. The first inlet 1010a is in fluid communication with the first cavity 1006b (e.g., an interior surface of) of the first diffusor 1006 and the second inlet 1010*b* is in fluid communication with the second cavity 1008*b* (e.g., an interior surface of) the second diffusor 1008. In some examples, a first seal (e.g., a rubber or metallic material) can be provided around the first opening 1006*c* and a second seal (e.g., a rubber or metallic material) can be provided around the second opening 1008*c* to prevent leakage through the respective first and second openings 1006*c*, 1008*c* of the first and second diffusors 1006, 1008. In some examples, the first diffusor 1006 can be integrally formed with the first inlet 1010*a* and/or the first inlet extension 406 as a unitary structure. Likewise, in some examples, the second diffusor 1008 can be integrally formed with the second inlet 1010*b* and/or the second inlet extension 408 as a unitary structure. The first and second diffusors 1006, 1008 can be composed of aluminum, titanium and/or any other material(s) or alloy(s) that prevent or reduce radiation heat transfer. For example, the first and second diffusors 1006, 1008 can be made from the same material as the thermal protection plate 203.

When the landing gear 114 is in the retracted position 200 as shown, for example, in FIG. 10B, the first diffusor 1006 is positioned over a first rim 418 of a first wheel 410 and the second diffusor 1008 is positioned over a second rim 420 of a second wheel 412. Specifically, the first diffusor 1006 has a size or shape (e.g., a diameter, a peripheral profile) that is substantially similar to (e.g., identical or within 10 percent of) a size or shape (e.g., a diameter, a peripheral profile) of the first rim 418 and the second diffusor 1008 has a size or shape (e.g., a diameter, a peripheral profile) that is substantially similar to (e.g., identical or within 10 percent of) a size or shape (e.g., a diameter, a peripheral profile) of the second rim 420. Thus, the first diffusor 1006 is positioned over and/or above (e.g., hovers over) the first rim 418 and the second diffusor 1008 is positioned over and/or above (e.g., hovers over) the second rim 420. Additionally, a first gap 1012 is formed between a peripheral edge 1014 of the first diffusor 1006 and the first rim 418. A second gap 1016 is formed between a peripheral edge 1018 of the second diffusor 1008 and the second rim 420. In other words, the first diffusor 1006 does not directly engage or contact the first rim 418 and the second diffusor 1008 does not directly engage or contact the second rim 420 when the landing gear 114 is in the retracted position 200. The first gap 1012 and/or the second gap 1016 can be between approximately one inch and twelve inches. In some examples, the first diffusor 1006 and/or the second diffusor 1008 can have a rectangular shape, a square shape, and/or any other shape. In some examples, the first diffusor 1006 and the second diffusor 1008 can be configured as a unitary structure defining a dome or cavity that extends across (e.g., surrounds or encompasses) the first rim 418 and the second rim 420 (e.g., an elongated, dome-shaped structure).

The fluid passageway 202 operates substantially similar (e.g., identical) to the fluid passageway 202 described in connection with the thermal control systems 102, 400, 500, 600, 700, 800, and/or 900 described above. In some examples, the heat shield system 1004 (e.g., the first and second diffusors 1006, 1008) can be implemented with any of the example thermal control systems 102, 400, 500, 600, 700, 800, and/or 900 described above.

In operation, the first and second diffusors 1006, 1008 collect or trap heated air rising from the wheels 116 within the respective first cavity 1006*b* and the second cavity 1008*b* and block or restrict radiation heat from the brakes 118 of the wheels 116 from transferring to the primary structure 201 and/or other components in the wheel well 120. Additionally, the fluid passageway 202 removes or ventilates heat air from within the first and second cavities 1006*b*, 1008*b* of the first and second diffusors 1006, 1008 and, thus, the wheel well 120. In some examples, a suction generated by the fluid passageway 202 at the respective first inlet 1010*a* and the second inlet 1010*b* causes heat that rises from a third brake 422 of a third wheel 424 and/or heat that rises from a fourth brake 426 of a fourth wheel 428 to flow through the first gap 1012 and into the first cavity 1006*b* of the first diffusor 1006 and/or to flow through the second gap 1016 and into the second cavity 1008*b* of the second diffusor 1008. The thermal control system 1000 of FIGS. 10A-10C reduces heat transfer by convention (e.g., via the fluid passageway 202) and radiation (e.g., via the diffusors).

Figure 11A:
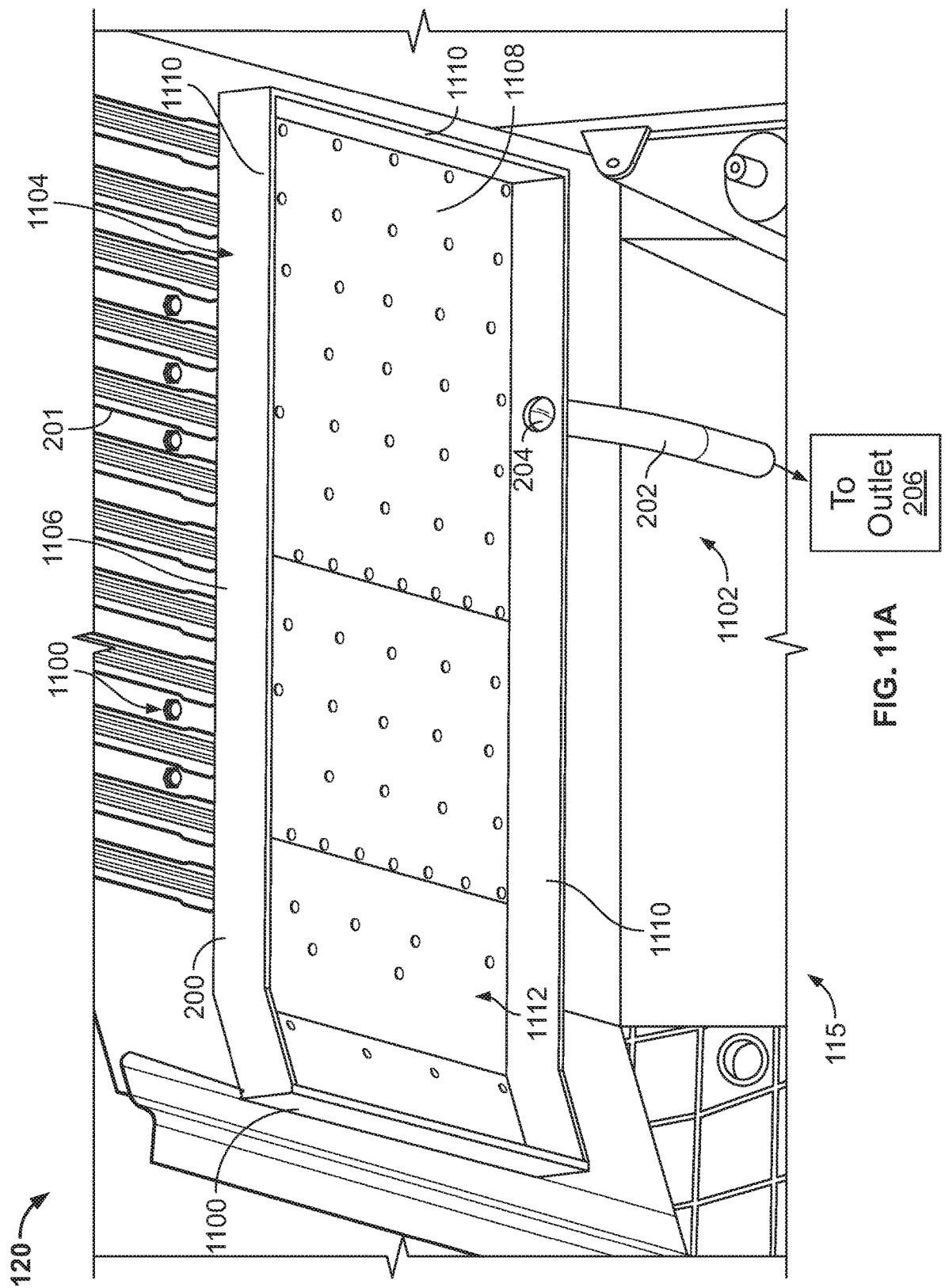
FIGS. 11A-11B illustrate another example thermal control system disclosed herein.
Figure 11B:
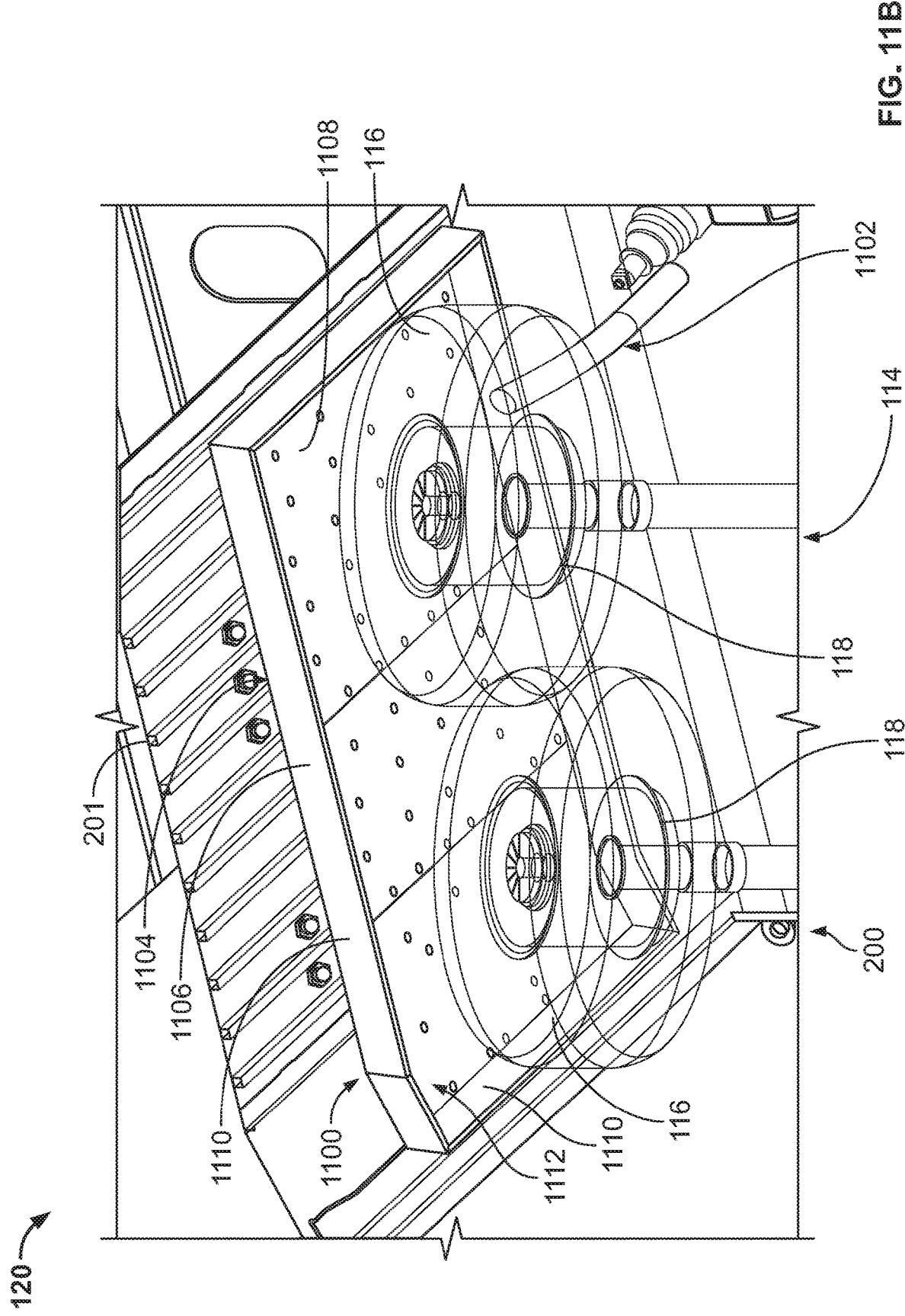

FIGS. 11A-B illustrate another example thermal control system 1100 disclosed herein. Those components of the thermal control system 1100 of FIGS. 11A-11B that are substantially similar or identical to the components of the thermal control system 500, the thermal control system 400, and the thermal control system 102 described above and that have functions substantially similar or identical to the functions of those components will not be described in detail again below. Instead, the interested reader is referred to the above corresponding descriptions. To facilitate this process, similar reference numbers will be used for like structures.

FIG. 11A is a perspective view of the thermal control system 1100 in a wheel well 120 with a landing gear 114 in a deployed position 115. FIG. 11B is a perspective view of the wheel well 120 of FIG. 11A with the landing gear 114 in a retracted position 200.

The thermal control system 1100 combines a ventilation system 1102 to reduce convective heat transfer to a primary structure 201 and/or components in the wheel well 120 and a heat shield system 1104 to reduce radiation heat transfer to the primary structure 201 and/or components in the wheel well 120. For example, the ventilation system 1102 includes a fluid passageway 202 having an inlet 204 in fluid communication with the wheel well 120 and an outlet 206 to ventilate or exhaust heat from the brakes 118 of the wheels 116 in the wheel well 120 and the heat shield system 1104 includes a diffusor 1106 to block or reduce radiation from the brakes 118 of the wheels 116. The diffusor 1106 includes a thermal protection plate 1108 and an extension 1110 (e.g., a wall or lip). The thermal protection plate 1108 is attached to the primary structure 201 and is positioned to align with the wheels 116 of the landing gear 114 when the landing gear 114 is in the retracted position 200. The thermal protection plate 1108 of FIGS. 11A and 11B is a rectangular shaped plate. However, in other examples, the thermal protection plate 1108 can have a circular shape, a square shape and/or any other suitable shape. The extension 1110 surrounds peripheral edges of the thermal protection plate 1108. In some examples, the extension 1110 at least partially surrounds a perimeter or peripheral edge of the thermal protection plate 1108. The extension 1110 protrudes in a direction away from the thermal protection plate 1108 and towards the wheels 116. In this manner, the diffusor 1106 provided by the thermal protection plate 1108 and the extension 1110 defines a cavity 1112 (e.g., defines a volume) to collect heated air from the wheels 116 when the wheels 116 are positioned adjacent the diffusor 1106 (e.g., when the landing gear 114 is in the retracted position 200). The thermal protection plate 1108 and the extension 1110 can be composed of aluminum, titanium and/or any other suitable material(s). Additionally, the extension 1110 restricts or reduces heat from spilling over the peripheral edges of the thermal protection plate 1108 and rising towards the primary structure 201. Additionally, the ventilation system 1102 exhausts or ventilates heat from the cavity 1112 of the diffusor 1106. In other words, the cavity 1112 collects hot air plume and the fluid passageway 202 extracts the hot air from the cavity 1112. Thus, the thermal control system 1100 reduces convective heat transfer and radiation heat transfer to the primary structure 201 and/or other components or equipment located in the wheel well 120. As a result, a size (e.g., an area, a dimensional envelope, etc.) of the thermal protection plate 1108 can be smaller than known thermal protection plates, thereby reducing aircraft weight and increasing efficiency. In some examples, the ventilation system 1102 of FIGS. 11A and 11B can include a second passageway (e.g., similar or identical to the fluid passageway 202) located on an end of the thermal protection plate 1108 opposite the fluid passageway 202.

Figure 12A:
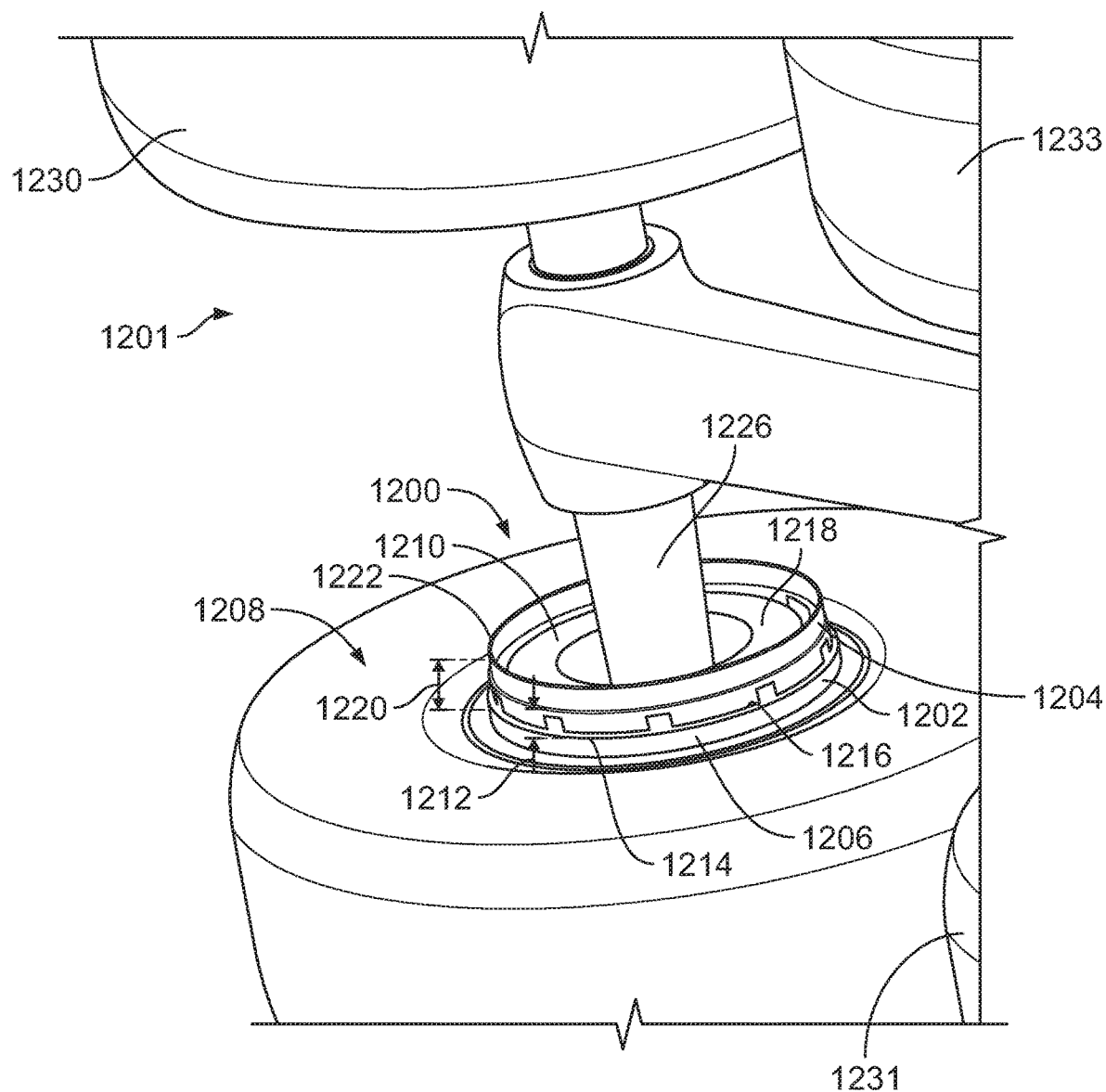
FIGS. 12A and 12B illustrate an example wheel of a landing gear disclosed herein that can implement a landing gear of the aircraft of FIG. 1.
Figure 12B:
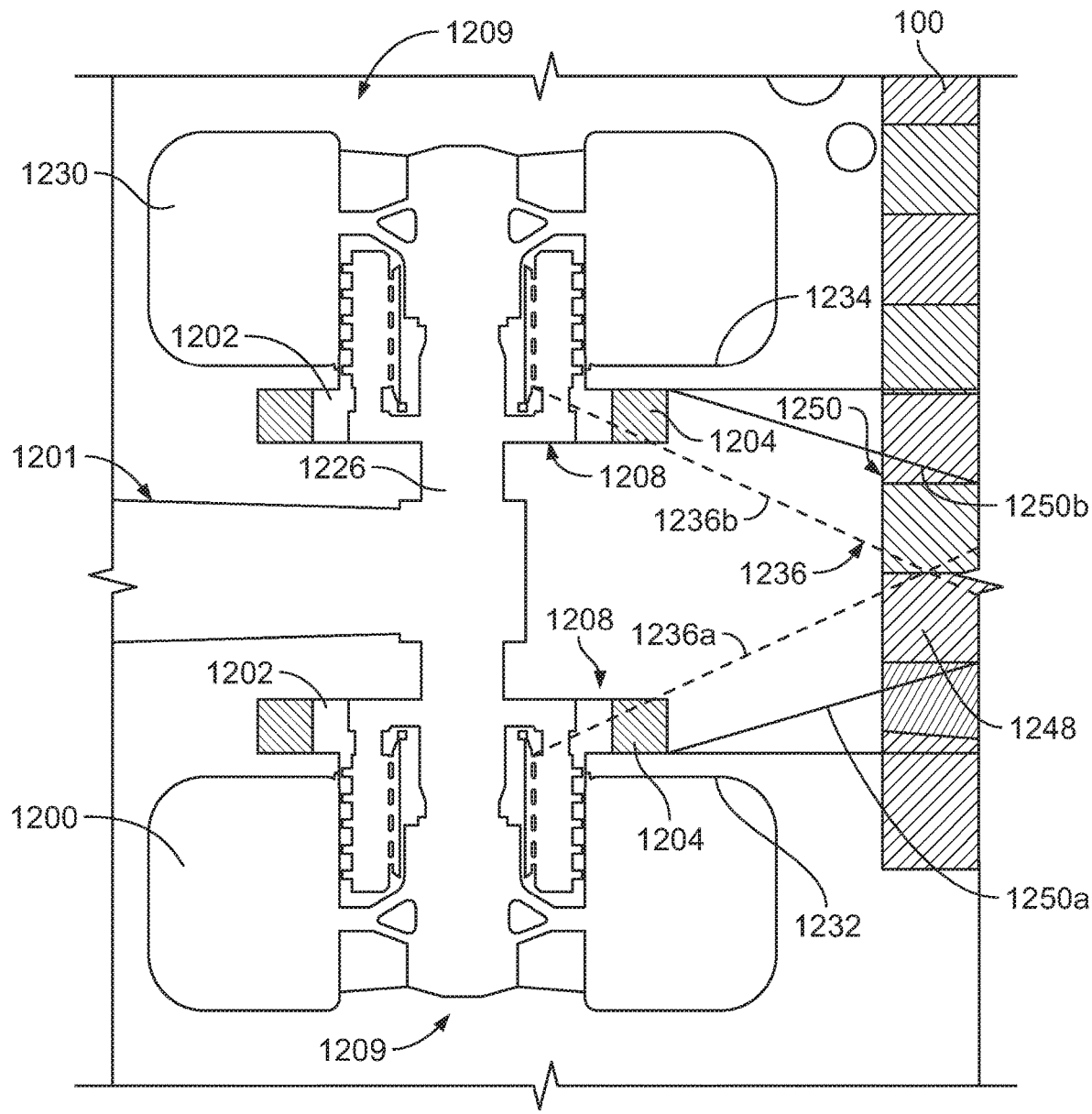

FIGS. 12A and 12B illustrate an example wheel 1200 of a landing gear 1201 disclosed herein that can implement the landing gear 114 of FIG. 1. The wheel 1200 includes a chin ring 1202 and a chin ring extension 1204 (e.g., a heat shield) coupled to a rim 1206 of the wheel 1200. Specifically, an inner side 1208 of the wheel 1200 shown in FIG. 12A includes the chin ring 1202 and the chin ring extension 1204. An outer side 1209 of the wheel 1200 opposite the inner side 1208 does not include the chin ring extension 1204. The chin ring 1202 is coupled to the rim 1206 and extends in a direction away from a brake 1210 of the wheel 1200. For example, the chin ring 1202 has a height 1212 between an upper surface 1214 (e.g. a peripheral edge) of the rim 1206 and an upper surface 1216 (e.g. a peripheral edge) of the chin ring 1202. In some examples, the height 1212 is approximately between 3 inches and 6 inches. Specifically, the upper surface 1216 of the chin ring 1202 is slightly above (e.g., between an inch and three inches) an outermost surface 1218 of the brake 1210. Thus, the upper surface 1216 of the chin ring 1202 extends above or past the outermost surface 1218 of the brake 1210. The chin ring extension 1204 is coupled to the chin ring 1202 and extends in a direction away from the upper surface 1216 of the chin ring 1202. The extension ring 1204 has a height 1220 between an upper surface 1222 of the chin ring extension 1204 and the upper surface 1214 of the rim 1206. In some examples, the height 1220 is approximately between six inches and twelve inches. Thus, the upper surface 1222 of the chin ring extension 1204 is above (e.g., between three inches and nine inches) the outermost surface 1218 of the brake 1210 by a distance that is greater than a distance between the upper surface 1216 of the chin ring 1202 and the outermost surface 1218 of the brake 1210. The landing gear 1201 includes the wheels 1200, 1230 supported on by a first axle 1226 and includes wheel 1231 and wheel 1233 supported by a second axle. In some examples, the landing gear 1201 can be implemented without the wheels 1231 and 1233.

The chin ring 1202 is coupled or attached to the rim 1206 and the chin ring extension 1204 is coupled or attached to the rim 1206. For example, the chin ring 1202 is coupled to the rim 1206 via fasteners (e.g., bolts, welds, etc.). Likewise, the chin ring 1202 is coupled to the rim 1206 via fasteners (e.g., bolts, welds, etc.). In some examples, the chin ring 1202 and the chin ring extension 1204 are a unitary structure (e.g., a one-piece structure). In some examples, the chin ring 1202, the chin ring extension 1204 and the rim 1206 form a unitary structure (e.g., a one-piece structure). The landing gear 1201 includes a wheel 1230 that is substantially similar to (e.g., a mirror image) of the wheel 1200.

FIG. 12B is a top view of the landing gear 1201 of FIG. 12A. In this example, the inner side 1208 of the wheel 1200 includes the chin ring 1202 and the chin ring extension 1204. Likewise, as noted above, the inner side 1208 of the wheel 1230 includes the chin ring 1202 and the chin ring extension 1204. In some examples, the outer side 1209 of the wheel 1200 and/or the wheel 1230 can include the chin ring 1202 and/or the chin ring extension 1204. In some examples, only the wheels 1200 includes the chin ring 1202 and the chin ring extension 1204.

In operation, the chin ring 1202 blocks or impedes radiation from the brake 1210 from affecting (e.g., impacting) a tire 1232 of the wheel 1200 and a tire 1234 of the wheel 1230. For example, the chin ring 1202 of the wheel 1200 and the chin ring 1202 of the wheel 1230 provides a radiation profile 1236 (e.g., a radiation line of sight) represented by dashed lines in FIG. 12B. For example, the chin ring 1202 of the wheel 1200 and the chin ring 1202 of the wheel 1230 causes the radiation profile 1236 in a direction away from the tire 1232 of the wheel 1200 and the tire 1234 of the wheel 1230.

However, the radiation profile 1236 provided by the chin ring 1202 of the wheel 1200 (i.e., absent the chin ring extension 1204 of the wheel 1200) and the chin ring 1202 of the wheel 1230 (i.e., absent the chin ring extension 1204 of the wheel 1230) forms an overlapping radiation profile 1236 at a distance from the wheels 1200, 1230 that can affect surrounding structure 1248 of the aircraft 100. Specifically, a radiation profile 1236a from the brake 1210 of the wheel 1200 overlaps with radiation profile 1236b of the brake 1210 of the wheel 1230. The overlapping radiation profile 1236 can cause significant heat (e.g., hot spots), which can affect surrounding structure 1248 (e.g., primary structure) of the aircraft 100. Some example aircraft employ a thermal protection plate (e.g., a heat shield) along the surrounding structure 1248 affected by the overlapping radiation profile 1236 to block the radiation of the overlapping radiation profile 1236. However, the thermal protection plate increases manufacturing costs and add weight to the aircraft that decreases aircraft efficiency.

The chin ring extension 1204 alters or modifies a radiation profile 1250 (e.g., a radiation line of sight) of the brake 1210 of the wheel 1200 and the brake 1210 of the wheel 1230. Specifically, the chin ring extension 1204 prevents the radiation profile 1250 from overlapping. For example, the chin ring extension 1204 prevents or reduces the overlapping radiation profile 1250 that can otherwise form absent the chin ring extension 1204 of the wheel 1200 and the chin ring extension 1204 of the wheel 1230. In other words, the chin ring extension 1204 of the wheel 1200 directs a source of heat from the brake 1210 of the wheel 1200 in a radiation profile 1250a and the chin ring extension 1204 of the wheel 1230 directs a source of heat from the brake 1210 of the wheel 1230 in a radiation profile 1250b that does not overlap the radiation profile 1250a (e.g., at the surrounding structure 1248 of the aircraft 100.) Thus, the chin ring extension 1204 does not have an overlapping radiation profile that can otherwise occur when the wheels 1200, 1230 are implemented with the chin rings 1202 and without the chin ring extensions 1204. As a result, the aircraft 100 does not require thermal protection plates on the surrounding structure 1248, thereby reducing manufacturing costs and increasing efficiency. In some examples, the chin ring extension 1204 enable use of a smaller sized thermal protection plate on the surrounding structure 1248, thereby reducing manufacturing costs and increasing efficiency.

Flowcharts representative of example methods 1300-1600 for implementing the controller 508 of FIGS. 5-9 are shown in FIGS. 13-16. The flowcharts are representative of hardware logic, machine readable instructions, hardware implemented state machines, and/or any combination thereof for implementing the controller 508 of FIGS. 5-9. The machine readable instructions may be one or more executable programs or portion(s) of an executable program for execution by a computer processor such as the processor 1712 shown in the example processor platform 1700 discussed below in connection with FIG. 17. The program may be embodied in software stored on a non-transitory computer readable storage medium such as a CD-ROM, a floppy disk, a hard drive, a DVD, a Blu-ray disk, or a memory associated with the processor 1712, but the entire program and/or parts thereof could alternatively be executed by a device other than the processor 1712 and/or embodied in firmware or dedicated hardware. Further, although the example programs are described with reference to the flowchart illustrated in FIGS. 13-16, many other methods of implementing the example controller 508 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 13-16 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 13:
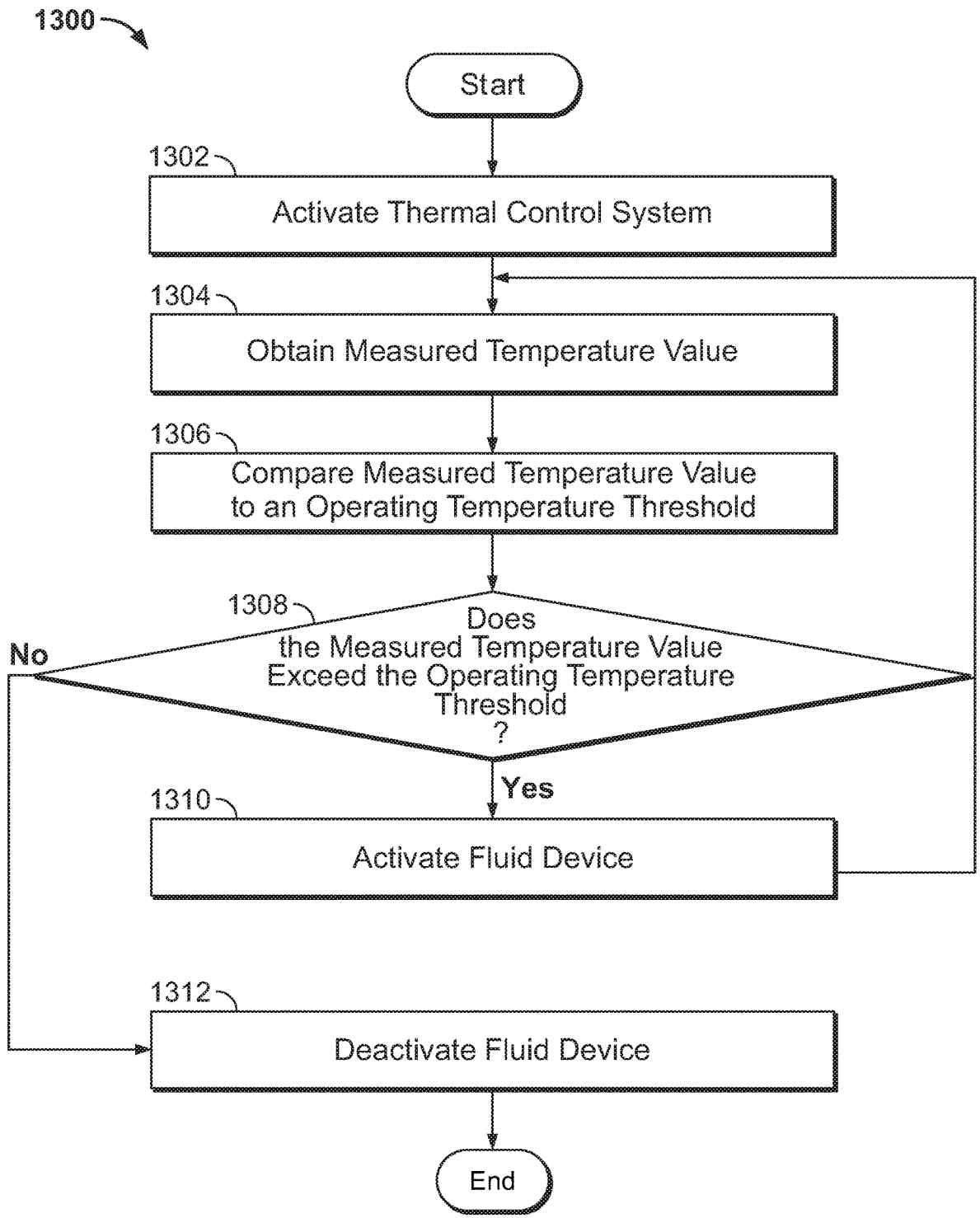
FIGS. 13-16 are flowcharts representative of example methods 1300-1600 for implementing a controller of the example thermal control systems of FIGS. 5-9.

The method 1300 of FIG. 13 can implement the example thermal control system 500 of FIG. 5, the example thermal control system 800 of FIG. 8, and/or the example thermal control system 900 of FIG. 9.

The method 1300 begins when the controller 508 activates the thermal control system 500 (block 1302). For example, the landing gear position detector 512 can receive a signal from the position sensor 511 indicative of the landing gear being in the retracted position 200. The controller 508 can initiate activation of the thermal control system 500 upon detection of the landing gear moving from the deployed position 115 to the retracted position 200. After the method ends (i.e., when the fluid device is deactivated), in some examples, the controller 508 does not activate the thermal control system until the controller 508 detects movement of the landing gear 114 from the deployed position 115 to the retracted position 200. In some examples, the controller 508 activates the thermal control system 500 for a duration of time after takeoff (e.g., two hours after take-off). For example, the controller 508 can receive or obtain one or more parameters from an engine controller or aircraft controller to determine when the aircraft is in flight.

The controller 508 obtains a measured temperature value (block 1304). For example, the temperature determiner 510 receives a measured temperature value from the temperature sensor 506 representative of the fluid flowing through the fluid passageway 202. In some examples, the temperature determiner 510 receives a measured temperature value from the temperature sensor 522 representative of an air temperature of air in the wheel well 120. In some examples, the temperature determiner 510 determines the measured temperature value by determining an average temperature value of the measured temperature value from temperature sensor 506 and the measured temperature value from the temperature sensor 522.

The controller 508 compares the measured temperature value to an operating temperature threshold (block 1306). For example, the controller 508 and/or the comparator 514 retrieves and/or otherwise obtains the operating temperature threshold from the threshold database 520 and the comparator 514 compares the measured temperature value to the operating threshold temperature.

The controller 508 then determines if the measured temperature value exceeds the operating temperature threshold (block 1308). If the controller at block 1308 determines that measured temperature value exceeds the operating temperature threshold, then the controller 508 activates a fluid device (block 1310). For example, the device operator 516 causes the fluid valve 504 to move to an open position to allow fluid flow through the fluid passageway 202 between the inlet 204 and the outlet 206. In some examples, the device operator 516 causes the flow generator 804 to activate or turn-on to allow fluid flow through the fluid passageway 202 between the inlet 204 and the outlet 802. In some examples, the device operator 516 causes the fluid valve 908 and to move to an open position to allow fluid flow through the fluid passageway 202 between the inlet 204 and the outlet 802.

If the controller at block 1308 determines that measured temperature value does not exceed the operating temperature threshold, then the controller 508 deactivates the fluid device (block 1312). For example, the device operator 516 causes the fluid valve 504 to move to a closed position to prevent or restrict fluid flow through the fluid passageway 202 between the inlet 204 and the outlet 206. In some examples, the device operator 516 causes the flow generator 804 to deactivate or turn-off to prevent fluid flow through the fluid passageway 202 between the inlet 204 and the outlet 802. In some examples, the device operator 516 causes the fluid valve 908 and to move to an open position to allow fluid flow through the fluid passageway 202 between the inlet 204 and the outlet 802.

Figure 14:
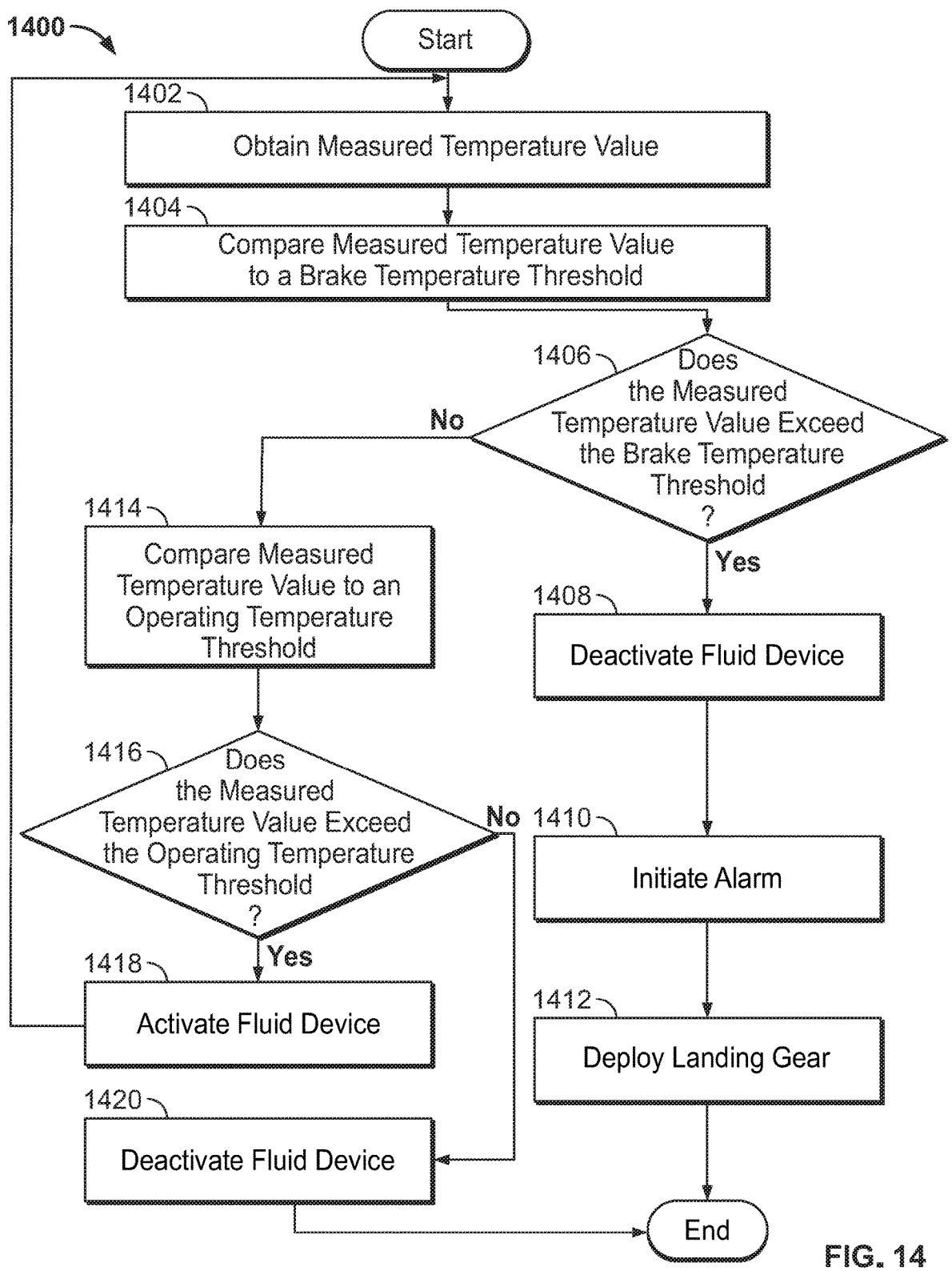

The method 1400 of FIG. 14 can implement the example thermal control system 600 of FIG. 6. The controller 508 obtains a measured temperature value (block 1402). For example, the temperature determiner 510 receives a first measured temperature value from the first brake sensor 604 representative of the fluid flowing through the first inlet 402 and/or a second measured temperature value from the second brake sensor 606 representative of the fluid flowing through the second inlet 404. In some examples, the temperature determiner 510 determines the measured temperature value by determining an average temperature value of the first measured temperature value from the first brake sensor 604 and the second measured temperature value from the second brake sensor 606.

The controller 508 compares the measured temperature value to a brake temperature threshold (block 1404). For example, the controller 508 and/or the comparator 514 retrieves and/or otherwise obtains the brake temperature threshold from the threshold database 520 and the comparator 514 compares the measured temperature value to the brake threshold temperature.

If the controller 508 at block 1406 determines that the measured temperature value exceeds the brake temperature threshold, the controller deactivates the fluid device (block 1408), initiates an alarm (block 1410) and/or deploys the landing gear (block 1412). For example, the device operator 516 commands the fluid valve 504 to move to a closed position to prevent fluid flow through the fluid passageway 202. The output generator 518 causes an alarm to initiate in the cockpit to alert staff and/or operates an actuator to move the landing gear 114 to the deployed position 115.

If the controller 508 at block 1406 determines that the measured temperature value does not exceed the brake temperature threshold, the controller 508 compares the measured temperature value to an operating temperature threshold (block 1414). The controller 508 then determines if the measured temperature value exceeds the operating temperature threshold (block 1416).

If the controller at block 1416 determines that measured temperature value exceeds the operating temperature threshold, then the controller 508 activates a fluid device (block 1418). For example, the device operator 516 causes the fluid valve 504 and to move to an open position to allow fluid flow through the fluid passageway 202 between the inlet 204 and the outlet 206. If the controller at block 1416 determines that measured temperature value does not exceed the operating temperature threshold, then the controller 508 deactivates the fluid device (block 1420). For example, the device operator 516 causes the fluid valve 504 to move to a closed position to prevent or restrict fluid flow through the fluid passageway 202 between the inlet 204 and the outlet 206.

Figure 15:
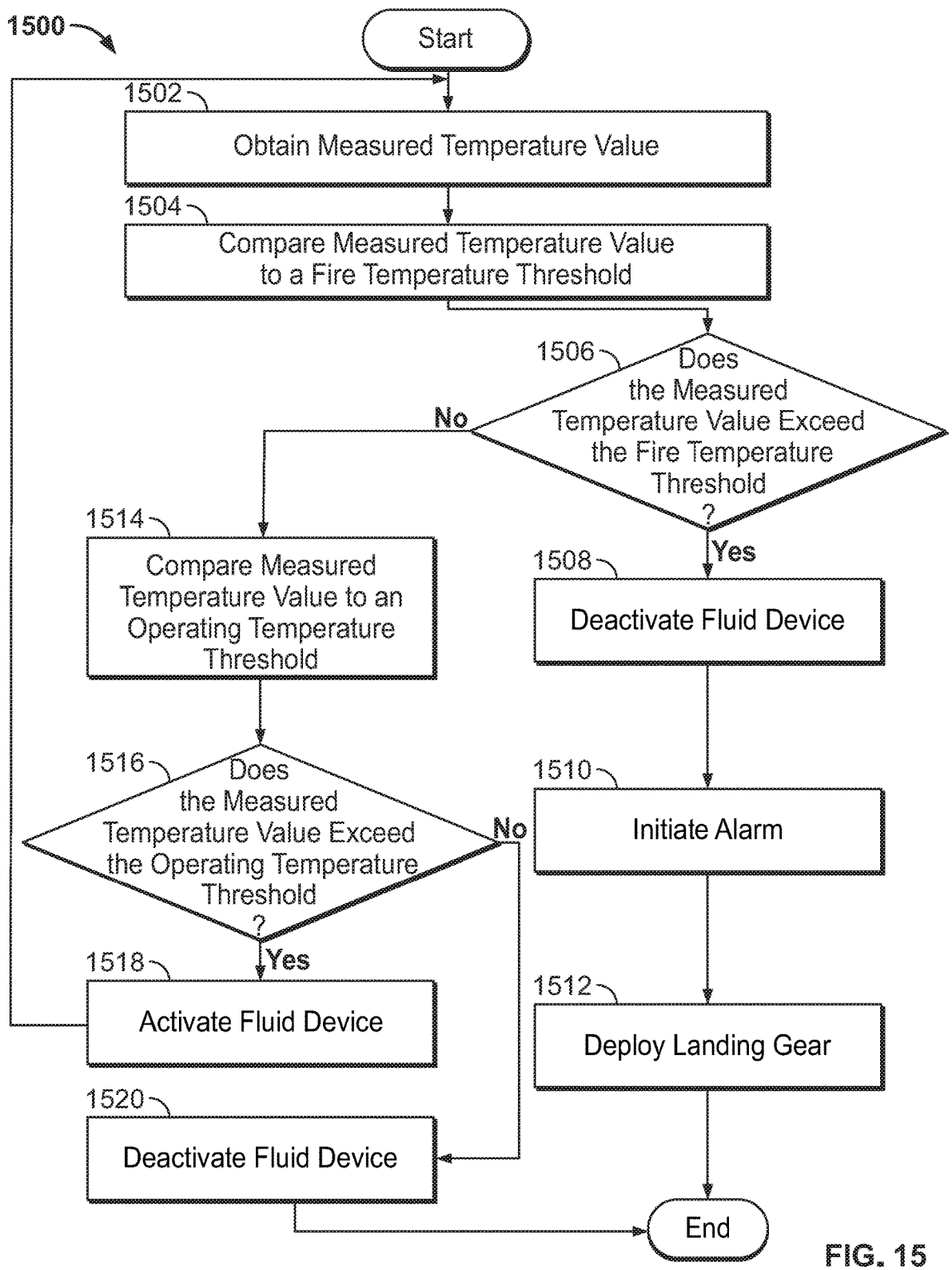

The method 1500 of FIG. 15 can implement the example thermal control system 700 of FIG. 7. The controller 508 obtains a measured temperature value (block 1502). For example, the temperature determiner 510 receives a measured temperature value from the fire sensor 704. The controller 508 compares the measured temperature value to a fire temperature threshold (block 1504). For example, the controller 508 and/or the comparator 514 retrieves and/or otherwise obtains the fire temperature threshold from the threshold database 520 and the comparator 514 compares the measured temperature value to the fire threshold temperature. The controller 508 then determines if the measured temperature value exceeds the fire temperature threshold (block 1506).

If the controller 508 at block 1506 determines that the measured temperature value exceeds the fire temperature threshold, the controller 508 deactivates a fluid device (block 1508), initiates an alarm (block 1510) and/or deploys the landing gear (block 1512). For example, the device operator 516 commands the fluid valve 504 to move to a closed position to prevent fluid flow through the fluid passageway 202. The output generator 518 causes an alarm to initiate in the cockpit to alert staff and/or operates an actuator to move the landing gear 114 to the deployed position 115.

If the controller 508 at block 1506 determines that the measured temperature value does not exceed the fire temperature threshold, the controller 508 compares the measured temperature value to an operating temperature threshold (block 1514) and determines if the measured temperature value exceeds the operating temperature threshold (block 1516).

If the controller at block 1516 determines that measured temperature value exceeds the operating temperature threshold, then the controller 508 activates a fluid device (block 1518). For example, the device operator 516 causes the fluid valve 504 to move to an open position to allow fluid flow through the fluid passageway 202 between the inlet 204 and the outlet 206. If the controller at block 1516 determines that measured temperature value does not exceed the operating temperature threshold, then the controller 508 deactivates the fluid device (block 1520). For example, the device operator 516 causes the fluid valve 504 to move to a closed position to prevent or restrict fluid flow through the fluid passageway 202 between the inlet 204 and the outlet 206.

Figure 16:
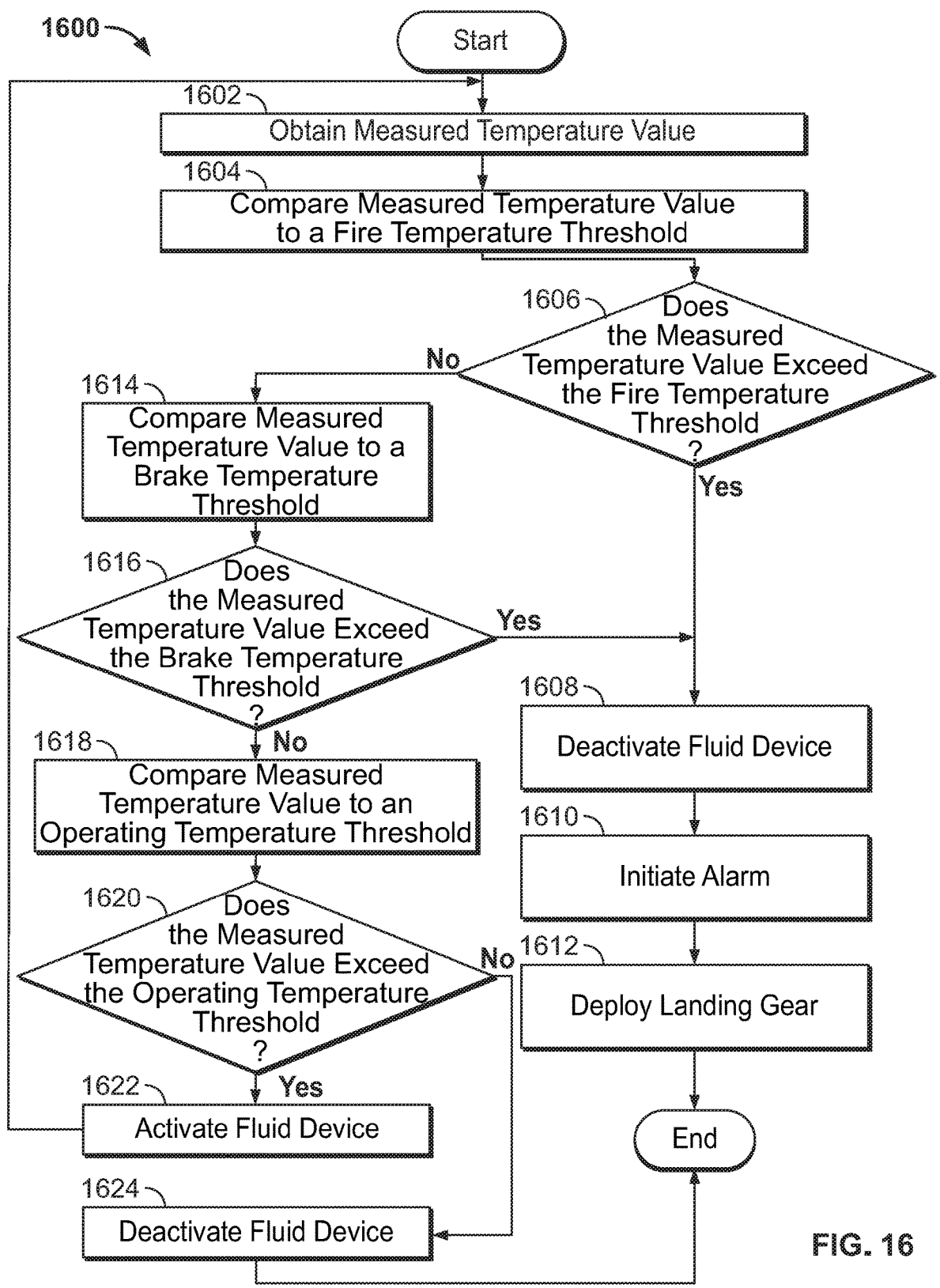

The method 1600 of FIG. 16 can implement the example thermal control system disclosed herein that includes the brake overheat detection system 602 of FIG. 6 and the fire detection system of FIG. 7. The controller 508 obtains a measured temperature value (block 1602). For example, the temperature determiner 510 receives a measured temperature value from the first brake sensor 604, the second brake sensor 606 and/or the fire sensor 704. The controller 508 compares the measured temperature value to a fire temperature threshold (block 1604). For example, the controller 508 and/or the comparator 514 retrieves and/or otherwise obtains the fire temperature threshold from the threshold database 520 and the comparator 514 compares the measured temperature value to the fire threshold temperature. The controller 508 then determines if the measured temperature value exceeds the fire temperature threshold (block 1606).

If the controller 508 at block 1606 determines that the measured temperature value does not exceed the fire temperature threshold, the controller 508 compares the measured temperature value to a brake temperature threshold (block 1614). For example, the controller 508 and/or the comparator 514 retrieves and/or otherwise obtains the brake temperature threshold from the threshold database 520 and the comparator 514 compares the measured temperature value to the brake threshold temperature. The controller 508 then determines if the measured temperature value exceeds the brake temperature threshold (block 1616).

If the controller 508 at block 1606 determines that the measured temperature value exceeds the fire temperature threshold or if the controller 508 at block 1616 determines that the measured temperature value exceeds the brake temperature threshold, the controller 508 deactivates a fluid device (block 1608), initiates an alarm (block 1610) and/or deploys the landing gear (block 1612). For example, the device operator 516 commands the fluid valve 504 to move to a closed position to prevent fluid flow through the fluid passageway 202. The output generator 518 causes an alarm to initiate in the cockpit to alert staff and/or operates an actuator to move the landing gear 114 to the deployed position 115.

If the controller 508 at block 1616 determines that the measured temperature value does not exceed the brake temperature threshold, the controller 508 compares the measured temperature value to an operating temperature threshold (block 1618) and determines if the measured temperature value exceeds the operating temperature threshold (block 1618).

If the controller at block 1618 determines that measured temperature value exceeds the operating temperature threshold, then the controller 508 activates a fluid device (block 1622). For example, the device operator 516 causes the fluid valve 504 and to move to an open position to allow fluid flow through the fluid passageway 202 between the inlet 204 and the outlet 206. If the controller at block 1620 determines that measured temperature value does not exceed the operating temperature threshold, then the controller 508 deactivates the fluid device (block 1624). For example, the device operator 516 causes the fluid valve 504 to move to a closed position to prevent or restrict fluid flow through the fluid passageway 202 between the inlet 204 and the outlet 206.

Figure 17:
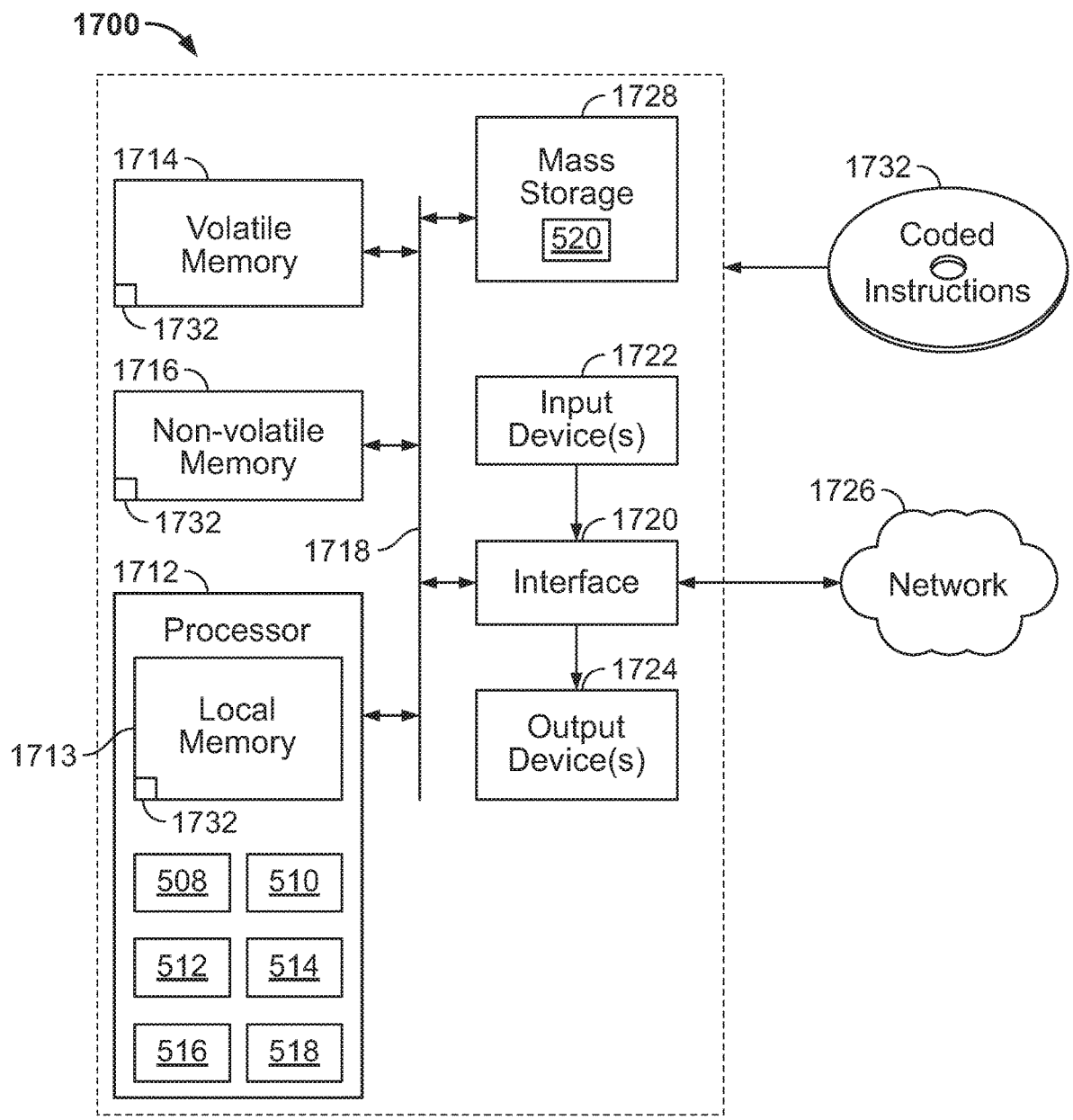
FIG. 17 is a block diagram of an example processor platform structured to execute the instructions of FIGS. 13-16 to implement the controller of FIG. 5-9.

FIG. 17 is a block diagram of an example processor platform 1700 structured to execute the instructions of FIGS. 13-16 to implement the controller 508 of FIG. 5-9. The processor platform 1700 can be, for example, a server, a personal computer, a workstation, a self-learning machine (e.g., a neural network), a mobile device (e.g., a cell phone, a smart phone, a tablet such as an iPad'), an Internet appliance, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the temperature determiner 510, the landing gear position detector 512, the comparator 514, the device operator 516, and the output generator 518.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), a Bluetooth® interface, a near field communication (NFC) interface, and/or a PCI express interface.

In the illustrated example, one or more input devices 1722 are connected to the interface circuit 1720. The input device(s) 1722 permit(s) a user to enter data and/or commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1720 of the illustrated example, thus, typically includes a graphics driver card, a graphics driver chip and/or a graphics driver processor.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives.

The machine executable instructions 1732 of FIGS. 13-16 may be stored in the mass storage device 1728, in the volatile memory 1714, in the non-volatile memory 1716, and/or on a removable non-transitory computer readable storage medium such as a CD or DVD.

In some examples, the thermal control systems 102, 400-1100 and/or the ventilation systems 202a, 400a, 500a, 600a, 700a, 800a, 900a, 1102, 1102 provide means for ventilating or exhausting heat from brakes of wheels positioned in a wheel well. In some examples, the thermal control systems 102, 400-1100 and/or the passageway 202, the inlet 204, the first inlet 402, the second inlet 404, the outlet 206, the outlet 802, the conduit and/or the duct provide means for defining a fluid passageway. In some examples, the outlet 206, the flow generator 804, the flow generator 902, and/or an eductor provide means for generating a pressure differential. In some examples, the heat shield system 1004, the first diffusor 1006, the second diffusor 1008, the first cavity 1006b, the second cavity 1008b, the heat shield system 1104 and/or the cavity 1112 provide means for collecting heat from a brake of a wheel of the landing gear. In some examples, the shut-off system 502, the fluid valve 504, the temperature sensor 506, the flow generator 804, the flow generator 902 the fluid valve 908 and/or the controller 508 provides means for controlling fluid flow through the passageway. In some examples, the brake overheat detection system 602, the first brake sensor 604, the second brake sensor 606, and/or the controller 508 provide means for detecting a brake overheat condition. In some examples, the fire detection system 702, the fire sensor 704, and/or the controller 508 provide means for detecting a fire. In some examples, the controller 508 provides means for controlling the thermal control systems 102, 400-1100 and/or the ventilation systems 202a, 400a, 500a, 600a, 700a, 800a, 900a, 1102, 1102. In some examples, the temperature determiner 510 provide means for determining a temperature of fluid in the passageway 202. In some examples, the comparator 514 provides means for comparing a measured temperature value (e.g., from the temperature sensor 506, the temperature sensor 522, the first brake sensor 604, the second brake sensor 606, the fire sensor 704) and a temperature threshold, a brake temperature threshold and/or a fire temperature threshold (e.g., from the threshold database). In some examples, the landing gear position detector 512 provides means for detecting a position of the landing gear 114. In some examples, the device operator 516 provides means for controlling a fluid device (e.g., the fluid valve 504, the flow generator 804, the flow generator 902, the fluid valve 908). In some examples, the output generator 518 provides means for initiating an alarm (e.g., in a cockpit of the aircraft) and/or means for operating/deploying the landing gear 114. In some examples, the threshold database 520 provides means for storing threshold values (e.g., the operating temperature threshold, the brake temperature threshold, and the fire temperature threshold).

Although each of the thermal control systems 102, 400-1100 and the wheel 1200 disclosed above have certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features. In some examples, a thermal control system disclosed in accordance with the teachings of this disclosure may have a combination of the features of the thermal control systems 102, 400-1100 and the wheel 1200, the shut-off system 502, the brake overheat detection system 602, the fire detection system 702, the chin ring 1202, the chin ring extension 1204, configured to perform the methods 1300-1600, and/or any other component(s), structure(s) or feature(s) disclosed herein.

At least some of the aforementioned examples include one or more features and/or benefits including, but not limited to, the following:

In some examples, thermal control system includes a conduit defining a fluid passageway between an inlet and an outlet. The inlet of the conduit positioned in fluid communication with a landing gear wheel well and the outlet of the conduit positioned in fluid communication with the atmosphere. The conduit generates a pressure differential through the fluid passageway between the inlet and the outlet to exhaust heat from the landing gear wheel well to the atmosphere.

In some examples, the inlet of the conduit is positioned immediately adjacent a brake of an aircraft wheel when the aircraft wheel is retracted and stored in the landing gear wheel well.

In some examples, the outlet is formed on an airfoil of the aircraft.

In some examples, the outlet is formed on a portion of an airfoil that has a pressure that is less than a pressure inside the landing gear wheel well.

In some examples, a valve is coupled to the fluid passageway. The valve is moveable between a first position to allow fluid flow through the fluid passageway from the inlet to the outlet when a temperature of air in the wheel well exceeds an operating temperature threshold, and a second position to prevent fluid flow through the fluid passageway from the inlet to the outlet when the temperature of air in the wheel well does not exceed the operating temperature threshold.

In some examples, a first temperature sensor measures a temperature of air flowing through the fluid passageway.

In some examples, a second temperature sensor measures temperature of air flowing through the fluid passageway.

In some examples, a fan is interposed with the fluid passageway to generate the pressure differential through the conduit between the inlet and the outlet.

In some examples, an eductor is in fluid communication with the fluid passageway. The eductor provides high pressure bleed air downstream from the inlet to generate the pressure differential through the fluid passageway to cause air from the wheel well to flow from the inlet toward the outlet.

In some examples, a diffusor defines a cavity to collect heat from a brake of a wheel of an aircraft.

In some examples, the cavity is in fluid communication with the inlet of the fluid passageway.

In some examples, the diffusor includes a dome-shaped structure defining the cavity.

In some examples, the diffusor includes a plate and an extension extending from the plate to define the cavity.

In some examples, the plate and the extension form a rectangular-shape.

In some examples, the inlet of the conduit is suspended from a support structure of the landing gear wheel well immediately adjacent a brake of a wheel of the aircraft when a landing gear of the aircraft is in a retracted position.

In some examples, a thermal control system includes a first conduit defining a first inlet positioned in a landing gear wheel well of the aircraft. The first inlet is located immediately adjacent a first brake of a first wheel of a first aircraft landing gear when the first aircraft landing gear is retracted in the landing gear wheel well. A second conduit defines a second inlet positioned in the landing gear wheel well of the aircraft. The second inlet is located immediately adjacent a second brake of a second wheel of the aircraft landing gear when the aircraft landing gear is retracted in the landing gear wheel well. A main conduit defines an outlet in fluid communication with the atmosphere. The main conduit fluid couples the first inlet of the first conduit and the second inlet of the second conduit to the outlet.

In some examples, the first inlet and the second inlet enable fluid flow to the outlet in response to a pressure differential generated through a fluid passageway defined by the main conduit.

In some examples, a first diffusor defines a first cavity positionable above the first wheel and in fluid communication with the first inlet. A second diffusor defines a second cavity positionable adjacent the second wheel and in fluid communication with the second inlet.

In some examples, a thermal control system includes means for defining a fluid passageway between an inlet and an outlet. The inlet of the means for defining a fluid passageway positioned in fluid communication with a landing gear wheel well. The outlet of the means for defining a fluid passageway positioned in fluid communication with the atmosphere. The system includes means for generating a pressure differential through the means for defining the fluid passageway to induce fluid flow from the inlet toward the outlet to exhaust heat from the landing gear wheel well.

In some examples, the system includes means for collecting heat from a brake of a wheel of the landing gear. The means for collecting heat including means for defining a cavity in fluid communication with the inlet of the means for defining the fluid passageway.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A thermal control system for use with an aircraft, the thermal control system comprising:
   a thermal protection plate to be positioned in a landing gear wheel well and above a landing gear of an aircraft;
   a lip extending from the thermal protection plate, the lip surrounding a perimeter of the thermal protection plate to define a cavity to align with one or more wheels of the landing gear when the landing gear is in a retracted position, the cavity to receive heat from the one or more wheels of the landing gear when the landing gear is in the retracted position, the lip to restrict heat from spilling over the perimeter of the thermal protection plate and rising toward a structure of the aircraft; and
   a pipe defining a fluid passageway between an inlet and an outlet, the inlet of the pipe positioned in fluid communication with the cavity, the outlet of the pipe positioned in fluid communication with the atmosphere, the pipe to generate a pressure differential through the fluid passageway between the inlet and the outlet to exhaust heat from the cavity to the atmosphere.

2. The thermal control system as defined in claim 1, wherein the inlet of the pipe is coupled to the lip.

3. The thermal control system as defined in claim 2, wherein the outlet is formed on an airfoil of the aircraft.

4. The thermal control system as defined in claim 3, wherein the outlet is formed on a portion of an airfoil that has a pressure that is less than a pressure inside the landing gear wheel well.

5. The thermal control system as defined in claim 1, further including a valve coupled to the fluid passageway, the valve moveable between a first position to allow fluid flow through the fluid passageway from the inlet to the outlet when a temperature of air in the wheel well exceeds an operating temperature threshold, and a second position to prevent fluid flow through the fluid passageway from the inlet to the outlet when the temperature of air in the wheel well does not exceed the operating temperature threshold.

6. The thermal control system as defined in claim 5, further including a first temperature sensor to measure a temperature of air flowing through the fluid passageway.

7. The thermal control system as defined in claim 6, further including a second temperature sensor to measure temperature of air flowing through the fluid passageway.

8. The thermal control system as defined in claim 1, further including a fan interposed with the fluid passageway to generate the pressure differential through the pipe between the inlet and the outlet.

9. The thermal control system as defined in claim 1, wherein the thermal control system is structured to remove brake heat from the wheel well prior to the brake heat mixing with air inside the wheel well.

10. The thermal control system as defined in claim 1, wherein the pipe is suspended from the thermal protection plate located inside the wheel well.

11. The thermal control system as defined in claim 1, further including an eductor to generate a pressure differential through the fluid passageway between the inlet and the outlet to exhaust heat from the cavity to the atmosphere.

12. A thermal control system for use with an aircraft, the thermal control system comprising:
   a conduit defining a fluid passageway between an inlet and an outlet, the inlet of the conduit positioned in fluid communication with a landing gear wheel well, the outlet of the conduit positioned in fluid communication with the atmosphere, the conduit to generate a pressure differential through the fluid passageway between the inlet and the outlet to exhaust heat from the landing gear wheel well to the atmosphere; and an eductor in fluid communication with the fluid passageway, the eductor to provide high pressure bleed air downstream from the inlet to generate the pressure differential through the fluid passageway to cause air from the wheel well to flow from the inlet toward the outlet.

13. The thermal control system as defined in claim 12, further including a diffusor, the diffusor defining a cavity to collect heat from a brake of a wheel of an aircraft.

14. The thermal control system as defined in claim 13, wherein the cavity is in fluid communication with the inlet of the fluid passageway.

15. The thermal control system as defined in claim 14, wherein the diffusor includes a dome-shaped structure defining the cavity.

16. The thermal control system as defined in claim 14, wherein the diffusor includes a plate and an extension extending from the plate to define the cavity.

17. The thermal control system as defined in claim 16, wherein the plate and the extension form a rectangular-shape.

18. The thermal control system as defined in claim 12, wherein the inlet of the conduit is suspended from a support structure of the landing gear wheel well immediately adjacent a brake of a wheel of the aircraft when a landing gear of the aircraft is in a retracted position.

19. A thermal control system for an aircraft, the thermal control system comprising:
 a first diffusor defining a first cavity to be positioned over a first rim of a first wheel of a landing gear, the first cavity to receive heat generated by the first wheel when the landing gear is in a retracted position;
 a first duct coupled to the first diffusor, the first duct defining a first inlet fluidly coupled to the first cavity of the first diffusor;
 a second diffusor defining a second cavity to be positioned over a second rim of a second wheel of the landing gear, the second cavity to receive heat generated by the second wheel when the landing gear is in the retracted position;
 a second duct coupled to the first diffusor, the second duct defining a second inlet fluidly coupled to the second cavity of the second diffusor;
 a main duct defining an outlet in fluid communication with the atmosphere, the main duct fluidly coupling the first inlet of the first duct and the second inlet of the second duct to the outlet.

20. The thermal control system as defined in claim 19, wherein the first inlet and the second inlet enable fluid flow to the outlet in response to a pressure differential generated through a fluid passageway defined by the main duct.

21. The thermal control system as defined in claim 19, wherein the first diffusor has an arcuate shape and has a first diameter that is substantially similar to a second diameter of the first rim, and wherein the second diffusor has an arcuate shape and has a third diameter that is substantially similar to a fourth diameter of the second rim.

22. A thermal control system for use with an aircraft, the thermal control system comprising:
 means for defining a fluid passageway between an inlet and an outlet, the inlet of the means for defining the fluid passageway positioned in fluid communication with a landing gear wheel well, the outlet of the means for defining the fluid passageway positioned in fluid communication with the atmosphere; and
 means for providing high pressure bleed air interposed in the means for defining the fluid passageway downstream from the inlet to generate a pressure differential through the means for defining the fluid passageway to induce fluid flow from the wheel well to flow from the inlet toward the outlet to exhaust heat from the landing gear wheel well.

23. The thermal control system as defined in claim 22, further including means for collecting heat from a brake of a wheel of a landing gear, the means for collecting heat including means for defining a cavity in fluid communication with the inlet of the means for defining the fluid passageway.

\* \* \* \* \*